US006839605B2

(12) United States Patent
Park et al.

(10) Patent No.: US 6,839,605 B2
(45) Date of Patent: Jan. 4, 2005

(54) APPARATUS AND METHOD FOR DIAGNOSING FAULTS IN HOT STRIP FINISHING ROLLING

(75) Inventors: Cheol-Jae Park, Gyeongbuk (KR); Seong-Cheol Hong, Gyeongbuk (KR); Kwan-Soo Kim, Gyeongbuk (KR); Kyu-Bum Han, Gyeongbuk (KR); Young-Jun Jo, Gyeongbuk (KR); Seong-Gap Choi, Gyeongbuk (KR); Wakamiya Yoshinori, Tokyo (JP); Nitta Isoko, Tokyo (JP); Inami Haruki, Tokyo (JP)

(73) Assignees: Posco Co., Ltd. (KR); Toshiba Mitsubishi-Electric Industrial Systems Corporation (JP)

( * ) Notice: Subject to any disclaimer, the term of this patent is extended or adjusted under 35 U.S.C. 154(b) by 0 days.

(21) Appl. No.: 10/718,489

(22) Filed: Nov. 20, 2003

(65) Prior Publication Data

US 2004/0153196 A1 Aug. 5, 2004

(30) Foreign Application Priority Data

| | | |
|---|---|---|
| Nov. 20, 2002 | (KR) | 10-2002-0072365 |
| Dec. 9, 2002 | (KR) | 10-2002-0077709 |
| Dec. 9, 2002 | (KR) | 10-2002-0077710 |
| Dec. 9, 2002 | (KR) | 10-2002-0077711 |
| Dec. 9, 2002 | (KR) | 10-2002-0077708 |
| Dec. 10, 2002 | (KR) | 10-2002-0078299 |

(51) Int. Cl.$^7$ ........................ G06F 19/00; B21B 37/00
(52) U.S. Cl. ......................... 700/155; 72/9.2; 702/185
(58) Field of Search ................ 72/1–9.5, 14.9–18.8, 72/31.01; 700/28–31, 148–156; 702/33, 35, 36, 97, 170, 182–185

(56) References Cited

U.S. PATENT DOCUMENTS

| | | | | |
|---|---|---|---|---|
| 5,142,891 A | * | 9/1992 | Kuwano | 72/11.4 |
| 5,493,885 A | * | 2/1996 | Nomura et al. | 72/9.1 |
| 5,692,404 A | * | 12/1997 | Kirii et al. | 72/15.1 |
| RE35,996 E | * | 12/1998 | Rasmussen | 702/43 |
| 5,860,304 A | * | 1/1999 | Anbe et al. | 72/9.1 |
| 5,966,682 A | * | 10/1999 | Gramckow et al. | 702/170 |
| 6,176,112 B1 | * | 1/2001 | Sykosch et al. | 72/11.4 |
| 6,199,418 B1 | * | 3/2001 | Tezuka | 72/9.1 |
| 6,216,503 B1 | * | 4/2001 | Kitajima et al. | 72/7.2 |
| 6,230,532 B1 | * | 5/2001 | Kaji et al. | 72/9.1 |
| 6,240,756 B1 | * | 6/2001 | Tsugeno | 72/8.1 |
| 6,456,898 B1 | * | 9/2002 | Modesto et al. | 700/206 |
| 6,721,620 B2 | * | 4/2004 | Jelali et al. | 700/148 |

FOREIGN PATENT DOCUMENTS

| | | |
|---|---|---|
| JP | 7-063605 | 3/1995 |
| JP | 7-251210 | 10/1995 |
| JP | 11-347614 | 12/1999 |
| KR | 2001027829 | 6/2001 |

* cited by examiner

*Primary Examiner*—Maria N. Von Buhr
(74) *Attorney, Agent, or Firm*—Webb Ziesenheim Logsdon Orkin & Hanson, P.C.

(57) ABSTRACT

The present invention relates to an apparatus and method for diagnosing faults in hot strip finishing rolling, which diagnoses thickness faults in hot strip finishing rolling, using preset data and real-time data on rolling and control conditions, equation models representing control and physical phenomena and a database constructed based on operation experiences.

The present invention comprises: a Supervisory Control Computer (SCC); an actually measured data collection unit; an exit side thickness gauge loaded-on determination unit; a part identification unit; an on-gauge ratio calculation unit; a primary fault determination unit; a secondary fault determination unit; and a confidence rate evaluation unit.

30 Claims, 28 Drawing Sheets

APPARATUS AND METHOD FOR DIAGNOSING FAULTS IN HOT STRIP FINISHING ROLLING

BACKGROUND OF THE INVENTION

1. Field of the Invention

The present invention relates generally to an apparatus and method for diagnosing faults in hot strip finishing rolling, and more particularly to an apparatus and method for diagnosing faults in hot strip finishing rolling, which diagnoses thickness faults in hot strip finishing rolling, using preset data and real-time data on rolling and control conditions, equation models representing control and physical phenomena and a database constructed based on operation experiences.

2. Description of the Related Art

Currently, in the field of hot strip finishing rolling, demands for the improved quality of products are raised and small batch production is used as a manufacturing method, so that a quality control system with higher accuracy is eagerly required.

The manufacturing of hot-rolled products is stably performed under high-accuracy control using a variety of computers and control systems, thus ensuring quality accuracy. However, when a control system is updated or even when the control system is stable, the instability of an operation or the defect of a product occasionally occurs.

The instability of an operation and the defects of products result from a fault in the material of a product, a fault in the operation method of an operator, a fault in rolling facility and a fault in a control system. When the instability of an operation and the defect of a product occur, it must be determined whether a system fault or an operator manipulation fault has occurred, and a counter measure must be taken to prevent the recurrence of the instability of the operation and the defect of the product. To diagnose faults, there have been used a method of comparing and analyzing the actually measured mean data of each product collected and stored in a computer, or performing verification through simulations using the actually measured mean data.

However, since it is necessary to identify causes while viewing an on-line analog data chart when a detailed cause analysis must be carried out, most of cases depend on the manual work of experts. Accordingly, an analysis period is excessively lengthened, and it is difficult to manage the actually measured data.

As a result, to manufacture high quality products using a quality control system, a diagnosis system for supporting the rapid estimation of the causes of a quality fault and a control fault that the operator cannot quickly identify is necessary.

Prior art relating to technologies for diagnosing the quality of a hot strip mill is described below.

First, there was disclosed Korean Unexamined Pat. Publication No. 2001-0027829 filed by POSCO and entitled "Apparatus for diagnosing faults in hot strip mill."

This prior art patent relates to an apparatus for diagnosing a facility fault and an operation fault in a hot strip mill composed of staged stands. In a steel plant, this fault diagnosing apparatus automatically performs the determination of thickness, shape and facility faults and diagnoses of causes of the faults, so that rapid, accurate diagnoses can be achieved. Diagnosis critical values must be appropriately adjusted so that determination results are matched with diagnosis results. With this adjustment, appropriate critical values can be maintained even when the characteristics of an object are changed, so that high-accuracy diagnoses can always be performed.

However, this prior art patent is constructed to determining whether faults have occurred by simply comparing actually measured values with the critical values. Accordingly, this prior art patent is different from the present invention in that the present invention is a rule-based method. Furthermore, this prior art patent is the technology of automatically changing critical values when the characteristics of an object are changed and performing diagnoses, so that the setting of optimal critical values is an important factor in the success of a diagnosis. However, the setting of optimal critical values is performed according to the type and size of steel, rolling conditions and the situations of a field and, thus, it is considerably difficult to set the optimal critical values.

Second, there was disclosed Japanese Unexamined Pat. Publication No. Hei 11-347614 filed by Mitsubishi Electric Corporation and entitled "Apparatus and method for diagnosing faults."

In this prior art patent, a deviation between the thickness of a rolled sheet and a target sheet thickness is calculated, and it is determined that a sheet thickness fault has occurred if the calculate deviation exceeds a preset reference value. That is, the local minimal value and local maximal value of a sheet thickness are detected, and it is determined that a thickness fault has occurred if the deviation between the local minimal value and local maximal value exceeds the preset reference value. Additionally, faults are diagnosed based on the balance of a roll speed, the actually measured torque of a mill motor and an actually measured rolling load.

However, since the thickness fault of a hot strip mill is incurred by a variety of causes, this prior art patent cannot perform desirable diagnoses.

Third, there was disclosed Japanese Unexamined Pat. Publication No. Hei 7-251210 filed by Mitsubishi Electric Corporation and entitled "Method of diagnosing faults in on-line roll grinding device."

This prior art patent is a technology for automatically diagnosing faults in an on-line roll grinding device without depending on operator's unaided eyes. This prior art patent is applied to an on-line roll grinding apparatus that grinds a workpiece while a roll located in a housing is rotated in contact with a whetstone and the whetstone is reciprocated in the direction of a roll axis. In accordance with the prior art patent, the output torque of a whetstone rotating device is detected while the roll is ground by the whetstone, and it is determined that a fault has occurred if the output torque is greater than an upper limit or less than a lower limit.

This prior art patent simply uses threshold values in the same manner as the above-described prior art patents, thus being incapable of fully diagnosing faults.

Fourth, there was disclosed Japanese Unexamined Pat. No. Hei 7-63605 filed by Nippon Steel Corporation and entitled "Apparatus for diagnosing faults in bearing for roll."

This prior art patent relates to an apparatus for diagnosing faults in a bearing for a roll that is capable of measuring a load applied by the roll to the bearing and diagnosing faults in a wide range. However, this prior art patent has the same disadvantages as the above-described prior art patents.

SUMMARY OF THE INVENTION

Accordingly, the present invention has been made keeping in mind the above problems occurring in the prior art, and an object of the present invention is to provide an apparatus and method for diagnosing faults in hot strip finishing rolling, which diagnoses thickness faults in hot strip finishing rolling, using preset data and real-time data on rolling and control conditions, equation models representing control and physical phenomena and a database constructed based on operation experiences.

Another object of the present invention is to provide an apparatus and method for diagnosing faults in hot strip finishing rolling, which provides an operator manipulation fault determination apparatus and method capable of determining whether quality deterioration attributable to operator's manipulation has occurred, a material fault determination apparatus and method capable of determining whether quality deterioration attributable to a defect in a finishing rolling exit side material has occurred, a control fault determination apparatus and method capable of determining whether quality deterioration attributable to a control fault has occurred, a facility fault determination apparatus and method capable of determining whether quality deterioration attributable to a facility fault has occurred, and a confidence rate determination apparatus capable of quickly and accurately identifying the cause of quality deterioration by calculating the confidence rate of a thickness fault analysis.

In order to accomplish the above object, the present invention provides an apparatus for diagnosing faults in hot strip finishing rolling, comprising a SCC setting unit for applying preset target values, such as a target thickness, a target load, a roll speed and a roll gap; an actually measured data collection unit for collecting actually measured data; an exit side thickness gauge loaded-on determination unit for determining whether an exit side thickness gauge is loaded on, and starting diagnoses of the faults in the hot strip finishing rolling if the exit side thickness gauge is loaded on; a part identification unit for identifying a front end part, body part and tail end part of a rolled sheet using thickness data; an on-gauge ratio calculation unit for calculating on-gauge ratios on the front end part, the body part and the tail end part using the actually measured data collected by the actually measured data collection unit and the preset target values set in the SCC setting unit; a primary fault determination unit for determining whether faults have occurred in the front end part, the body part and the tail end part using values output from the actually measured data collection unit and the on-gauge ratio calculation unit; a secondary fault determination unit for determining whether an operator intervention fault, a material fault, a facility fault and a control fault have occurred using values output from the actually measured data collection unit and the preset target values set in the SCC setting unit; and a confidence rate evaluation unit for evaluating confidence rates of determination results of the secondary fault determination unit using the preset target values set in the SCC setting unit and the actually measured values.

In addition, the present invention provides a method of diagnosing faults in hot strip finishing rolling, comprising the first step of presetting a target thickness, a target load, a target roll speed and a target roll gap according to rolling conditions; the second step of collecting actually measured data if an exit side thickness gauge is loaded on; the third step of identifying a front end part, a tail end part and a body part using the actually measured data; the fourth step of calculating on-gauge ratios in the front end part, the tail end part and the body part using the preset values of the first step and the actually measured data of the second step; the fifth step of determining whether faults have occurred in the front end part, the tail end part and the body part using the preset value of the first step and the on-gauge ratios of the fourth step; the sixth step of determining whether an operator intervention fault, a material fault and a control fault have occurred at a point where a sheet thickness fault occurred; and the seventh step of calculating a confidence rate of the control fault using the preset values of the first step and the actually measured data of the second step.

BRIEF DESCRIPTION OF THE DRAWINGS

The above and other objects, features and advantages of the present invention will be more clearly understood from the following detailed description taken in conjunction with the accompanying drawings, in which:

FIGS. 3a to 3c are flowcharts showing a process of diagnosing an operator manipulation fault in the method of diagnosing faults in hot strip finishing rolling in accordance with an embodiment of the present invention, wherein FIG. 3a is a flowchart showing a process of diagnosing the intervention of the operator in a roll gap, FIG. 3b is a flowchart showing a process of diagnosing the intervention of the operator in a roll speed, and FIG. 3c is a flowchart showing a process of diagnosing the intervention of the operator in a spraying operation;

FIGS. 5a to 5c are flowcharts showing a process of diagnosing material faults in the method of diagnosing faults in hot strip finishing rolling in accordance with an embodiment of the present invention, wherein FIGS. 5a and 5b are flowcharts showing a process of diagnosing a skid mark fault and FIG. 5c is a flowchart showing a process of diagnosing a transformation occurrence fault;

FIGS. 7a to 7f are flowcharts showing a process of diagnosing a control fault in the method of diagnosing faults in hot strip finishing rolling in accordance with an embodiment of the present invention, wherein FIG. 7a is a flowchart showing a process of diagnosing an FSU fault, FIG. 7b is a flowchart showing a process of determining whether a front end part V-shaped detect has occurred, FIG. 7c is a flowchart showing a process of determining whether a V-shaped defect has occurred, FIG. 7d is a flowchart showing a process of determining whether necking has occurred, FIG. 7e is a flowchart showing a process of determining whether a AGC gain fault has occurred, and FIG. 7f is a flowchart showing a process of determining whether an AGC controller fault has occurred;

FIGS. 10a and 10b are flowcharts showing a process of diagnosing a facility fault in the method of diagnosing faults in hot strip finishing rolling in accordance with an embodiment of the present invention, wherein FIG. 10a is a flowchart showing a process of diagnosing a roll eccentricity fault, and FIG. 10b is a flowchart showing a process of diagnosing a sensor fault;

FIGS. 12a to 12d are flowcharts showing a process of evaluating confidence rates in the method of diagnosing faults in hot strip finishing rolling in accordance with an embodiment of the present invention, wherein FIG. 12a is a flowchart showing a process of evaluating the confidence rate of operator roll speed intervention, FIG. 12b is a flowchart showing a process of evaluating the confidence rate of operator spraying intervention, FIG. 12c is a flowchart showing a process of evaluating the confidence rate of roll eccentricity, and FIG. 12d is a flowchart showing a process of evaluating the confidence rate of an FSU fault.

DESCRIPTION OF THE PREFERRED EMBODIMENTS

Figure 1A:
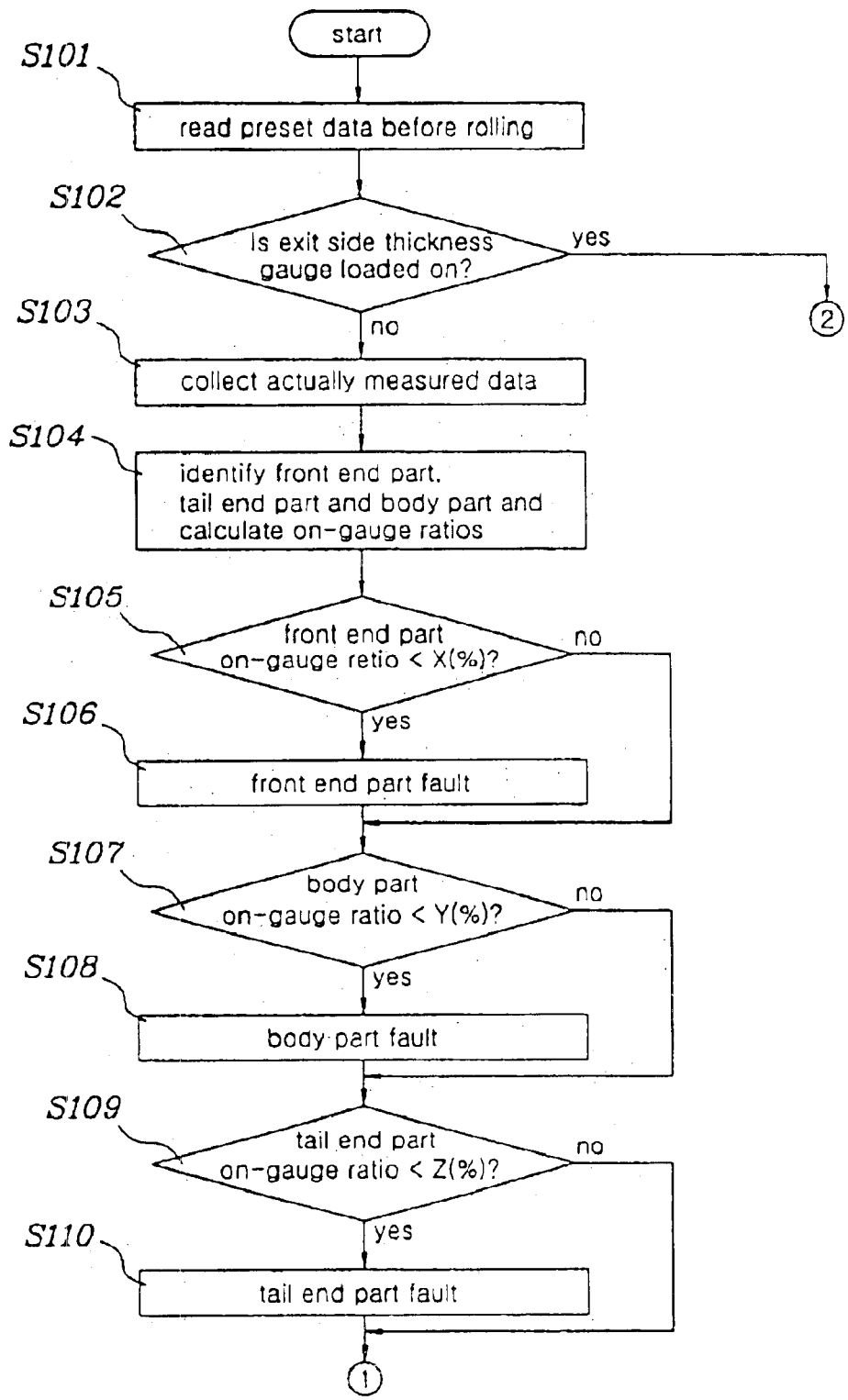
FIGS. 1a and 1b are flowcharts showing a method of diagnosing faults in hot strip finishing rolling in accordance with a preferred embodiment of the present invention.

Reference now should be made to the drawings, in which the same reference numerals are used throughout the different drawings to designate the same or similar components.

A preferred embodiment of the present invention is described in detail with reference to the accompanying drawings below.

Figure 1B:
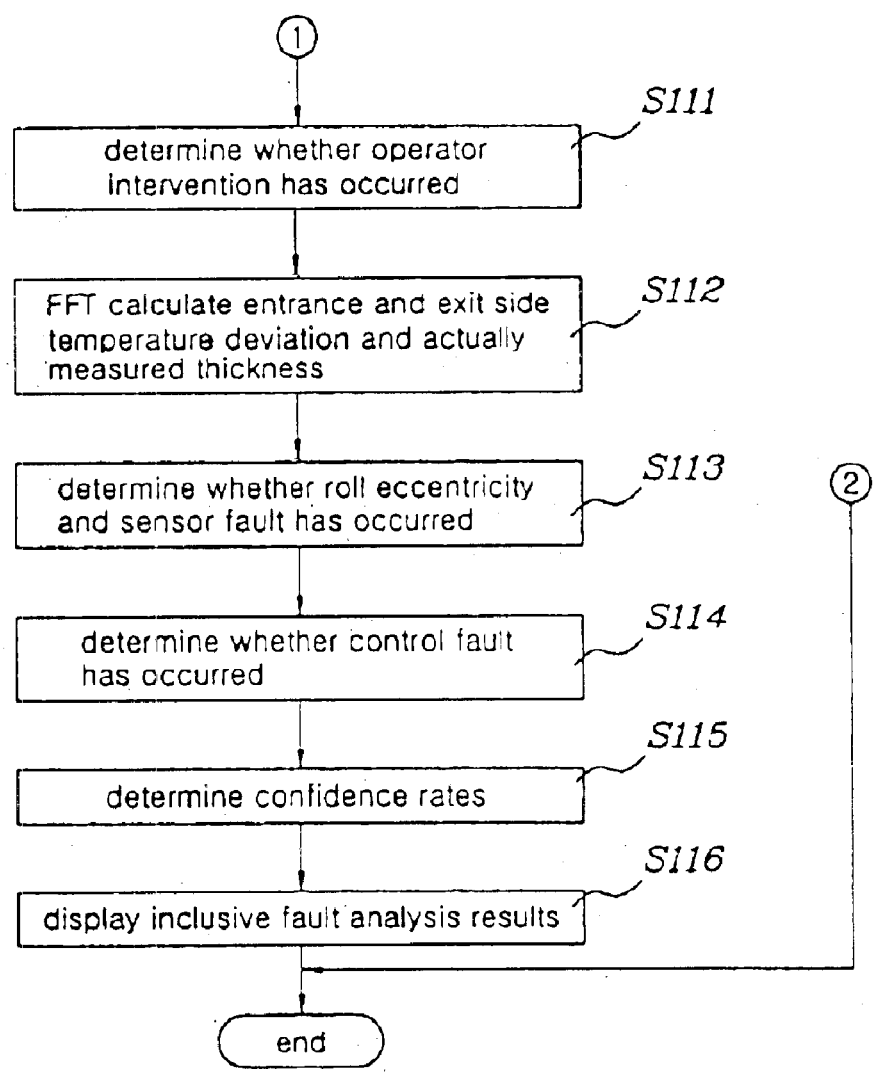
Figure 2:
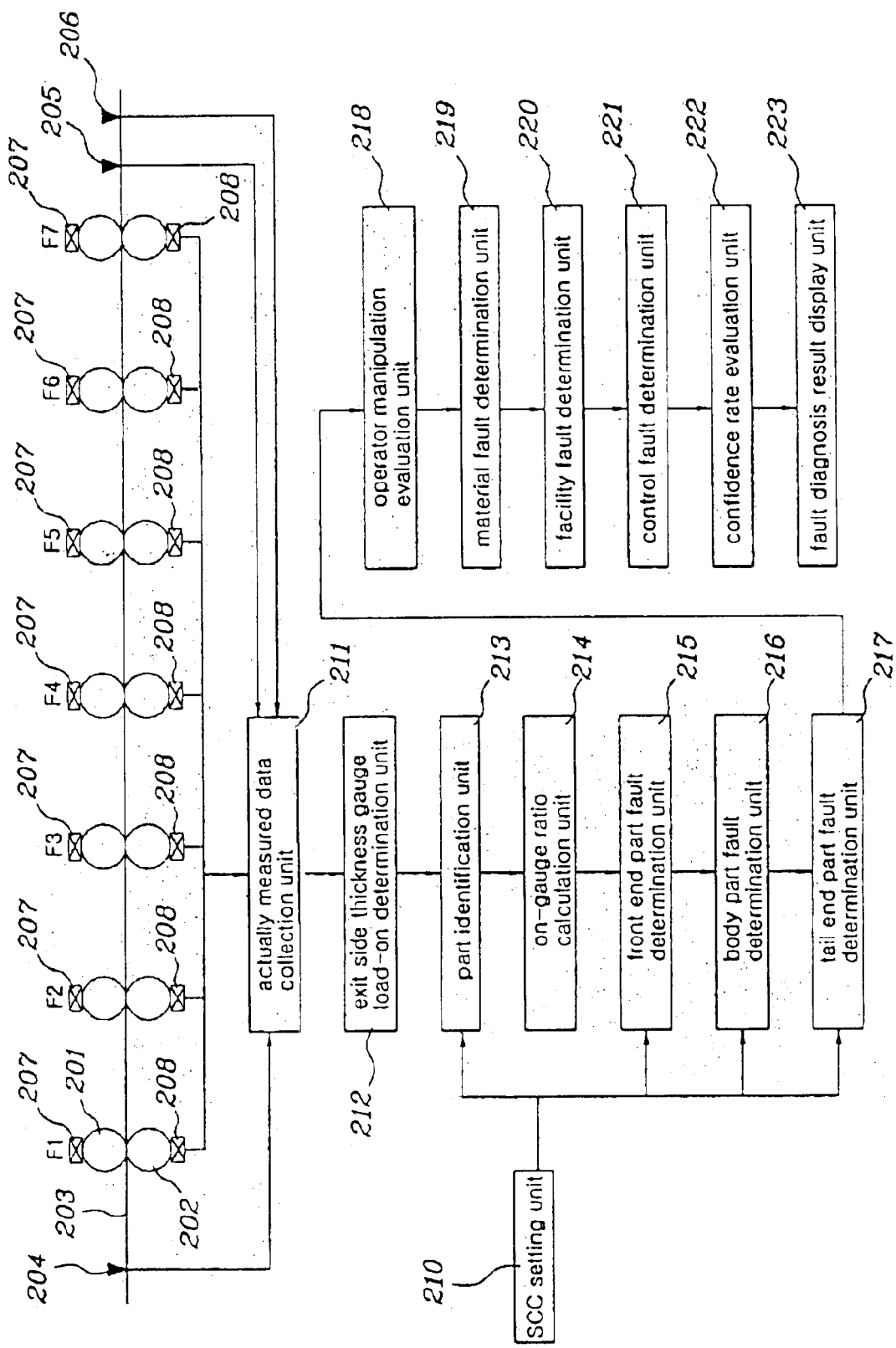
FIG. 2 is a configuration diagram showing an apparatus for diagnosing faults in hot strip finishing rolling in accordance with a preferred embodiment of the present invention.

FIGS. 1a, 1b and 2 are flowcharts showing a method of diagnosing faults in hot strip finishing rolling in accordance with a preferred embodiment of the present invention, which is described in detail below.

With reference to FIGS. 1a and 1b, the method of diagnosing faults in hot strip finishing rolling, which is proposed by the present invention, is constructed to include the following algorithm.

After values set according to rolling conditions, such as a target thickness, a target load, a roll speed and a roll gap, are read from a Supervisory Control Computer (SCC) setting unit 210 at step S101, it is determined whether a thickness signal of a rolled sheet 203 is applied from an exit side thickness gauge 205 located on the exit side of a stand, that is, whether the exit side thickness gauge 205 is loaded on at step S102.

If, as the result of the determination at step S102, the rolled sheet is detected, algorithms presented by the present invention are performed.

Actually measured data are collected from the thickness gauge 205, an entrance side temperature gauge 204, an exit side temperature gauge 206, a rolling load measurement sensor 207, and a roll gap measurement sensor 208 at step S103.

Thereafter, at steps S104 to S110, the front end part, tail end part and the body part of the rolled sheet 203 are identified using thickness data, and on-gauge ratios are calculated using the collected actually measured data and the preset data set in the SCC setting unit 210.

In that case, the front end part designates the portion of the rolled sheet ranging from the front end of the rolled sheet to the position of the rolled sheet spaced apart from the front end by X m, the tail end part designates the portion of the rolled sheet ranging from the tail end of the rolled sheet to the position of the rolled sheet spaced apart from the tail end by Y m, and the body part designates the remaining portion of the rolled sheet except for the front and tail end parts. The on-gauge ratios of the front and tail end parts and the body part are calculated as follows. That is, how many data of overall sample data fall within a thickness control tolerance is calculated from the actually measured exit side thicknesses of the rolled sheet. Thickness faults are judged from the calculated on-gauge ratios according to the following Determination equation 1.

[Determination Equation 1]

Thickness fault in front end part: if the on-gauge ratio of the front end part is less than X %, it is determined that a thickness fault has occurred in the front end part.

Thickness fault of body part: if the on-gauge ratio of the front end part is less than Y %, it is determined that a thickness fault has occurred in the body part.

Thickness fault in tail end part: if the on-gauge ratio of the front end part is less than Z %, it is determined that a thickness fault has occurred in the tail end part.

In this case, the values of X, Y and Z are set in the SCC setting unit 210.

Using the preceding Determination equation 1, it is determined whether a fault has occurred in each of the parts.

Thereafter, at steps S111 and S115, inclusive fault diagnoses are performed.

At step S111, it is determined whether operator intervention has occurred in a roll gap, a roll speed and spraying in each stand at a point when a plate thickness fault occurred. In this case, if it is determined that the operator intervention has occurred, the amount and polarity of intervention are evaluated through a detailed diagnosis.

At step S112, it is determined whether a quality fault is attributable to a defect in a material. In detail, the determination is carried out using the following three methods.

First, the expected and actually measured values of finishing entrance side temperature are evaluated according to the following Equation 1. Second, the expected and actually measured values of finishing entrance side temperatures are evaluated according to the following Equation 2. Third, the peak value of thickness deviation frequency components caused by a skid mark is evaluated through a Fast Fourier Transform (FFT) analysis of an actually measured finishing exit side thickness.

$$\Delta T = |\text{actually measured finishing entrance side temperature (actually measured FET)} - \text{expected finishing entrance side temperature (expected FET)}| > \alpha \quad (1)$$

$$\Delta T = |\text{actually measured finishing exit side temperature (actually measured FDT)} - \text{expected finishing exit side temperature (expected FDT)}| > \beta \quad (2)$$

Step S113 is the step of determining whether roll eccentricity and a sensor fault have occurred. For the roll eccentricity, the peak value of thickness deviation frequency components attributable to the roll eccentricity is evaluated by performing the FFT analysis of an actually measured thickness. For the sensor fault, when the actually measured data continuously deviate from a control tolerance, it is determined that the sensor fault has occurred.

At step S114, Finish Setup (FSU), Automatic Gauge Control (AGC) and a motor are examined to determine whether a control fault has occurred, and it is determined whether a rolled sheet is a first one of a lot or a first one fed after a roll is changed. An algorithm of determining whether the control fault has occurred is implemented by the following Determination equation 2.

[Determination Equation 2]

(1) FSU fault determination: it is determined whether the standard thickness deviation of the front end part is equal to or larger than X μm, or whether the actually measured thickness of the front end part is equal to or larger than the target thickness.

(2) AGC fault determination: if the on-gauge ratio of the body part is equal to or less than X %, it is determined that the AGC has not been normally performed.

(3) It is determined whether a current rolled sheet is a first one of a lot, or a first one fed after a roll is changed.

At step S115, the confidence rates of the above-described fault analyses are determined. The determination of the confidence rates enables the operator to quickly estimate a main one of various causes detected by the above-described fault analyses so that the operator can quickly remove the main cause. The above-described steps S111, S112, S113, S114 and S115 will be described in detail later.

At step S116, all the results of the above-described fault diagnoses obtained at the above-described steps are displayed.

FIG. 2 is a configuration diagram showing apparatuses for diagnosing faults in hot strip finishing rolling in accordance with a preferred embodiment of the present invention, which is described in detail below.

The apparatus for diagnosing faults in hot strip finishing rolling shown in FIG. 2 includes the SCC setting unit 210 for applying preset target values, such as a target thickness, a target load, a roll speed and a roll gap.

Additionally, the fault diagnosing apparatus includes an actually measured data collection unit 211 for collecting actually measured data from the thickness gauge 205, the entrance side temperature gauge 204, the exit side temperature gauge 206 and the roll gap measurement sensor 208.

Additionally, the fault diagnosing apparatus includes an exit side thickness gauge loaded-on determination unit 212 for determining whether an exit side thickness gauge is loaded on.

The fault diagnosing apparatus further includes a part identification unit 213 for identifying the front end part, body part and tail end part of the rolled sheet 203 using thickness data, and an on-gauge ratio calculation unit 214 for calculating on-gauge ratios in the front end part, the body part and the tail end part. In this case, the on-gauge ratios are calculated using the actually measured data and the values set in the SCC setting unit.

The fault diagnosing apparatus further includes a front end part fault determination unit 215 for determining whether a front end part fault has occurred, a body part fault determination unit 216 for determining whether a body part fault has occurred, and a tail end part fault determination unit 217 for determining whether a tail end part fault has occurred.

The fault diagnosing apparatus further includes an operator manipulation evaluation unit 218 for determining whether an operator has intervened in a roll gap, a roll speed and spraying at a point when a thickness fault occurred, a material fault determination unit 219 for determining whether a material fault has occurred using an entrance side and exit side temperature deviation and an actually measured thickness, a facility fault determination unit 220 for determining whether roll eccentricity or a sensor fault has occurred, and a control fault determination unit 221 for determining whether a control fault of a finishing mill has occurred.

The fault diagnosing apparatus includes a confidence rate evaluation unit 222 for evaluating the confidence rate of the operator manipulation evaluation unit 218, the material fault determination unit 219, the facility fault determination unit 220 and the control fault determination unit 221. The operator manipulation evaluation unit 218, the material fault determination unit 219, the facility fault determination unit 220 and the control fault determination unit 221 will be described in detail later. The fault diagnosing apparatus further includes a fault diagnosis result display unit 223 for inputting the results of fault diagnosis.

Figure 3A:
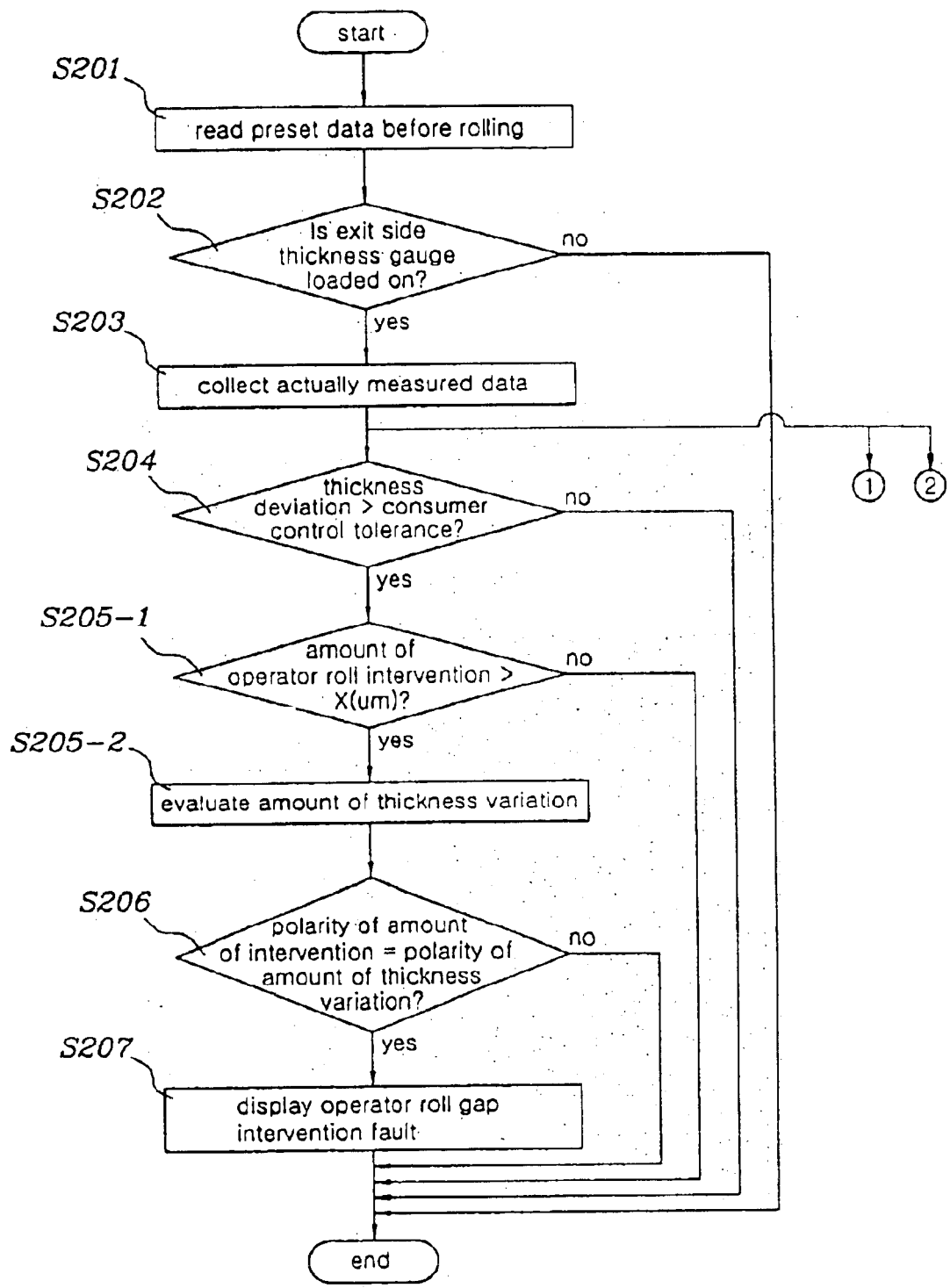
Figure 3B:
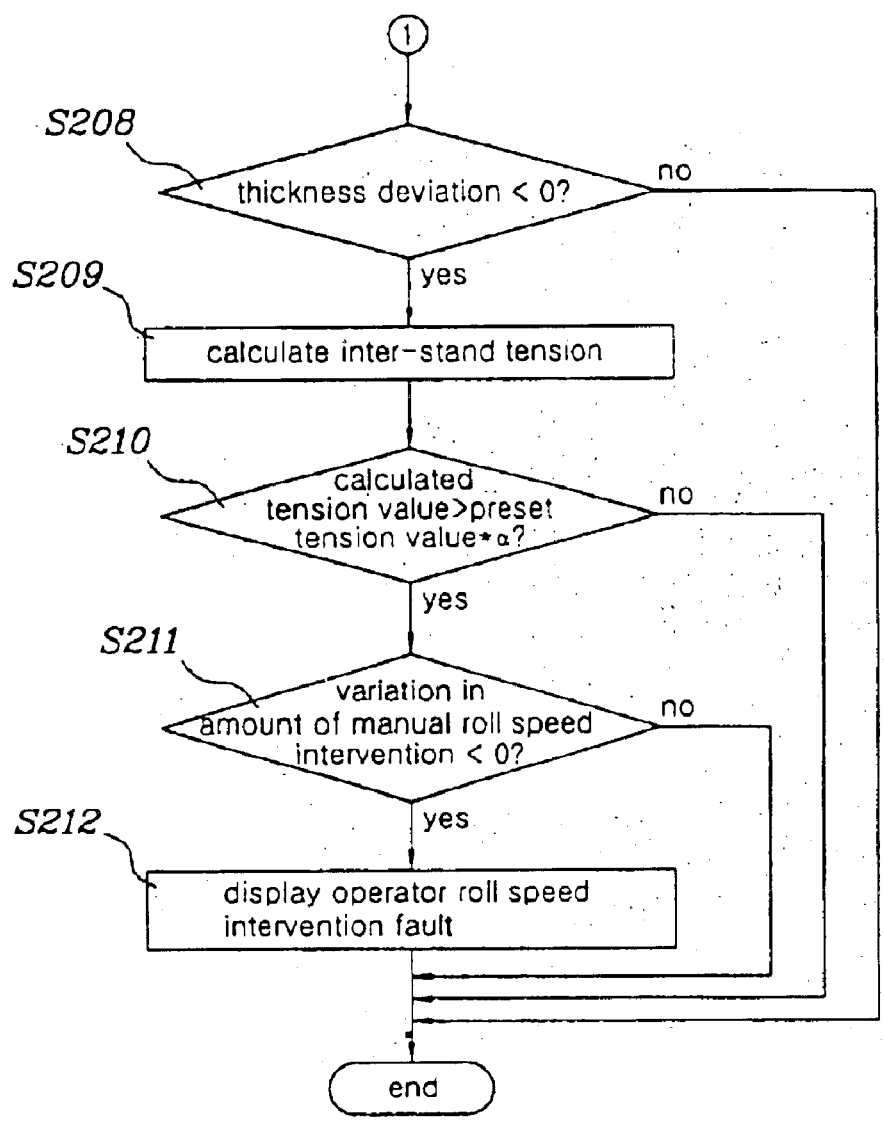
Figure 3C:
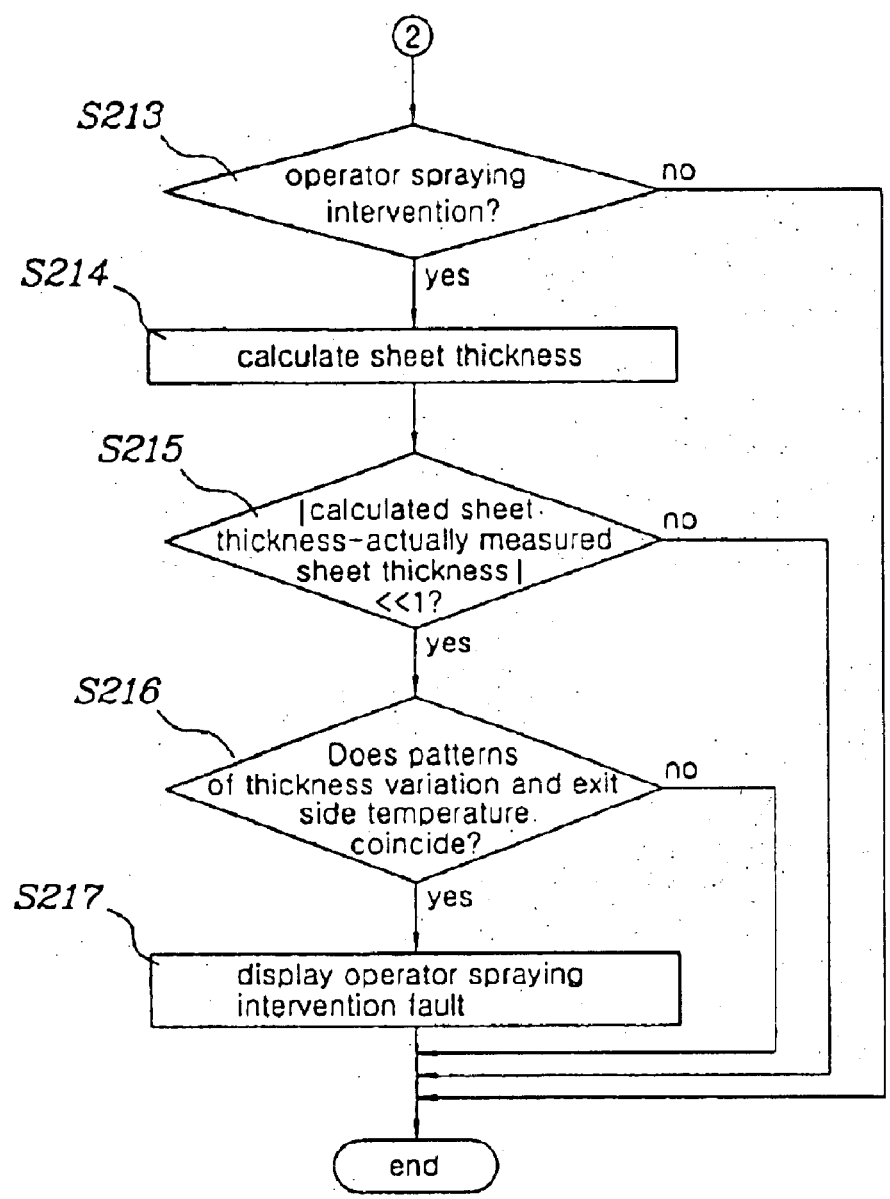

FIGS. 3a to 3c are flowcharts showing a process of diagnosing an operator manipulation fault in the method of diagnosing faults in hot strip finishing rolling in accordance with an embodiment of the present invention. FIG. 3a is a flowchart showing a process of diagnosing the intervention of the operator in a roll gap, FIG. 3b is a flowchart showing a process of diagnosing the intervention of the operator in a roll speed, and FIG. 3c is a flowchart showing a process of diagnosing the intervention of the operator in a spraying operation.

After values set according to rolling conditions, such as a target thickness, a target load, a roll speed and a roll gap, are read from an SCC setting unit 210 at step S201, it is determined whether a thickness signal of a rolled sheet 203 is applied from an exit side thickness gauge 205 located on the exit side of a stand, that is, whether an exit side thickness gauge 205 is loaded on at step S202. If the rolled sheet 203 is detected, algorithms presented by the present invention are performed.

At step S203, actually measured data are collected from a thickness gauge 205, an entrance side temperature gauge 204, an exit side temperature gauge 206, a rolling load measurement sensor 207, and a roll gap measurement sensor 208.

The processes shown in FIGS. 3a and 3c are sub-steps that correspond to step S11l to be performed after steps S101 to S110. These processes are performed after a thickness fault is detected, and are used to determine whether an operator manipulation fault has occurred using the data collected at step S203.

Subsequently, at step S204, it is determined whether a thickness deviation collected from the thickness gauge 205 is larger than a consumer control tolerance. This is performed because, if the collected thickness deviation is larger than the consumer control tolerance, it is determined that a thickness fault has occurred.

If, as the result of the determination at step S204, the thickness deviation is equal to or smaller than the consumer control tolerance, the process ends. If the collected thickness deviation is larger than the consumer control tolerance, it is determined whether the amount of intervention of the operator at a location where the thickness fault occurred is larger than X [μm] at step S205-1. In this case, X is a value preset in the SCC setting unit 210.

If, as the result of the determination at step S205-1, the amount of intervention of the operator is equal to or smaller than X, the process ends. If the amount of intervention of the operator is larger than X, the process proceeds because there is a great possibility that an operator's manipulation error has occurred.

At step S205-2, the amount of manual operator intervention is converted into the amount of thickness variation, and whether the intervention of the operator in a roll gap influences a thickness fault is determined based on the converted amount of thickness variation. The conversion into the amount of thickness variation is performed using the following equations.

*material deformation characteristic equation: $F=Q(H-h)$

*mill deformation characteristic equation:

$$h = S + \frac{F}{M}$$

From the preceding equations, $\Delta F = \Delta Q(H-h) + Q(\Delta H - \Delta h)$ is derived, and $$\Delta h = \frac{\Delta F}{M} + \Delta S$$

is obtained.

The following equations are established based on the preceding equations.

$$\Delta h = \frac{1}{M}[\Delta Q(H-h) + Q(\Delta H - \Delta h)] + \Delta S$$

$$\Delta h = \frac{Q}{M+Q}\Delta H + \frac{\Delta Q}{M+Q}(H-h) + \frac{M}{M+Q}\Delta S$$

If the Q error term of a corresponding stand is ignored and the amount of thickness variation attributable to the amount of roll gap correction of the corresponding stand is taken into consideration, the following equation is obtained.

$$\Delta h = \frac{Q}{M+Q}\Delta S$$

Additionally, if the amount of thickness variation attributable to the roll gap variation of a front end stand and the amount of thickness variation attributable to the amount of roll gap correction of a corresponding stand are taken into consideration, the amount of exit side thickness variation is calculated using the following Equation 3.

$$\Delta h = \frac{Q}{M+Q}\Delta H + \frac{M}{M+Q}\Delta S \qquad (3)$$

That is, for example, the amount of exit side thickness variation of No. 7 stand attributable to the amounts of roll gap variation of Nos. 6 and 7 stands can be obtained as expressed in the following Equation.

$$\Delta h_7 = \frac{Q_7}{M_7+Q_7}\Delta H_7 + \frac{M_7}{M_7+Q_7}\Delta S_7$$

$$= \frac{Q_7}{M_7+Q_7}\left(\frac{M_6}{M_6+Q_6}\Delta S_6\right) + \frac{M_7}{M_7+Q_7}\Delta S_7$$

Subsequently, it is determined whether the polarity of the amount of roll gap intervention of the operator coincides with the polarity of the amount of thickness variation at step S206. If they coincide with each other, the process ends. If not, an operator roll gap intervention fault is displayed and, thereafter, the process ends.

The flowchart shown in FIG. 3b shows the process of diagnosing the roll speed intervention of the operator that is performed after step S203, which is described in detail below.

At step S208, it is determined whether the thickness deviation is (−). Generally, the manual roll speed intervention of the operator is performed to tend to reduce a roll speed so as to prevent malfunction attributable to a loop, so that a tension is excessively applied. Accordingly, the excessively applied tension functions as a factor in the reduction of thickness and width deviations. By determining whether the thickness deviation is (−), it can be determined whether the roll speed intervention of the operator is appropriate.

If, as the result of the determination at step S208, the thickness deviation is not (−), the process ends. If the thickness deviation is (−), an inter-stand tension is calculated at step S209. The inter-stand tension can be easily obtained using the current of a looper motor.

Step S210 is the step of determining whether the calculated value of the inter-stand tension is larger than the set value of the inter-stand tension, at which it is determined how much larger the calculated value of the inter-stand tension is than the set value of the inter-stand tension so as to determine whether the manual roll speed intervention of the operator has occurred. Using the following Determination equation 3, it is determined whether the manual roll speed intervention fault has occurred.

[Determination Equation 3]

calculated tension value>preset tension value*α where α is a value set in the SCC setting unit 210.

If, as the result of the determination at step S210, the calculated value of the inter-stand tension is equal to or smaller than the set value of the inter-stand tension, the process ends. If the calculated value of the inter-stand tension is larger than the set value of the inter-stand tension, it is determined whether a variation in the amount of manual roll speed intervention is (−) at a point when the thickness fault occurred at step S211. Since the operator acts to reduce the speed, the variation in the amount of manual roll speed intervention becomes (−) at the point when the thickness fault occurred.

If, as the result of the determination at step S211, the variation in the amount of manual roll speed intervention is not (−), the process ends. If the variation in the amount of manual roll speed intervention is (−), it is determined that the roll speed intervention of the operator has occurred, a roll speed intervention fault is displayed on the output unit at step S212, and, thereafter, the process ends.

The flowchart shown in FIG. 3c shows the process of diagnosing the spraying intervention of the operator that is performed after step S203, which is described in detail below.

At step S213, it is determined whether the spraying intervention of the operator has occurred at a point when a thickness fault occurred.

If, as the result of the determination at step S213, the spraying intervention has not occurred, the process ends. If the spraying intervention has occurred, a sheet thickness is calculated using the load of a stand at the point, at step S214. In this case, the calculation of the sheet thickness can be performed using the mill deformation characteristic equation.

Step S215 is the step of comparing the sheet thickness calculated at step S214 with an actually measured sheet thickness. If the two values are similar to each other, it is determined that the temperature of the rolled sheet was decreased by the spraying intervention of the operator and, thus, there is a great possibility that a thickness fault has occurred.

If, as the result of the determination at S215, the two values are not similar to each other, the process ends. If the two values are similar to each other, it is determined whether the pattern of a thickness variation coincides with the pattern of an exit side temperature at step S216.

If, as the result of the determination at step S216, the pattern of a thickness variation does not coincide with the pattern of an exit side temperature, the process ends. If the pattern of a thickness variation coincides with the pattern of an exit side temperature, it is determined that an operator spraying intervention fault has occurred, the operator spraying intervention fault is displayed on the display unit at step S217, and the process ends.

Figure 4:
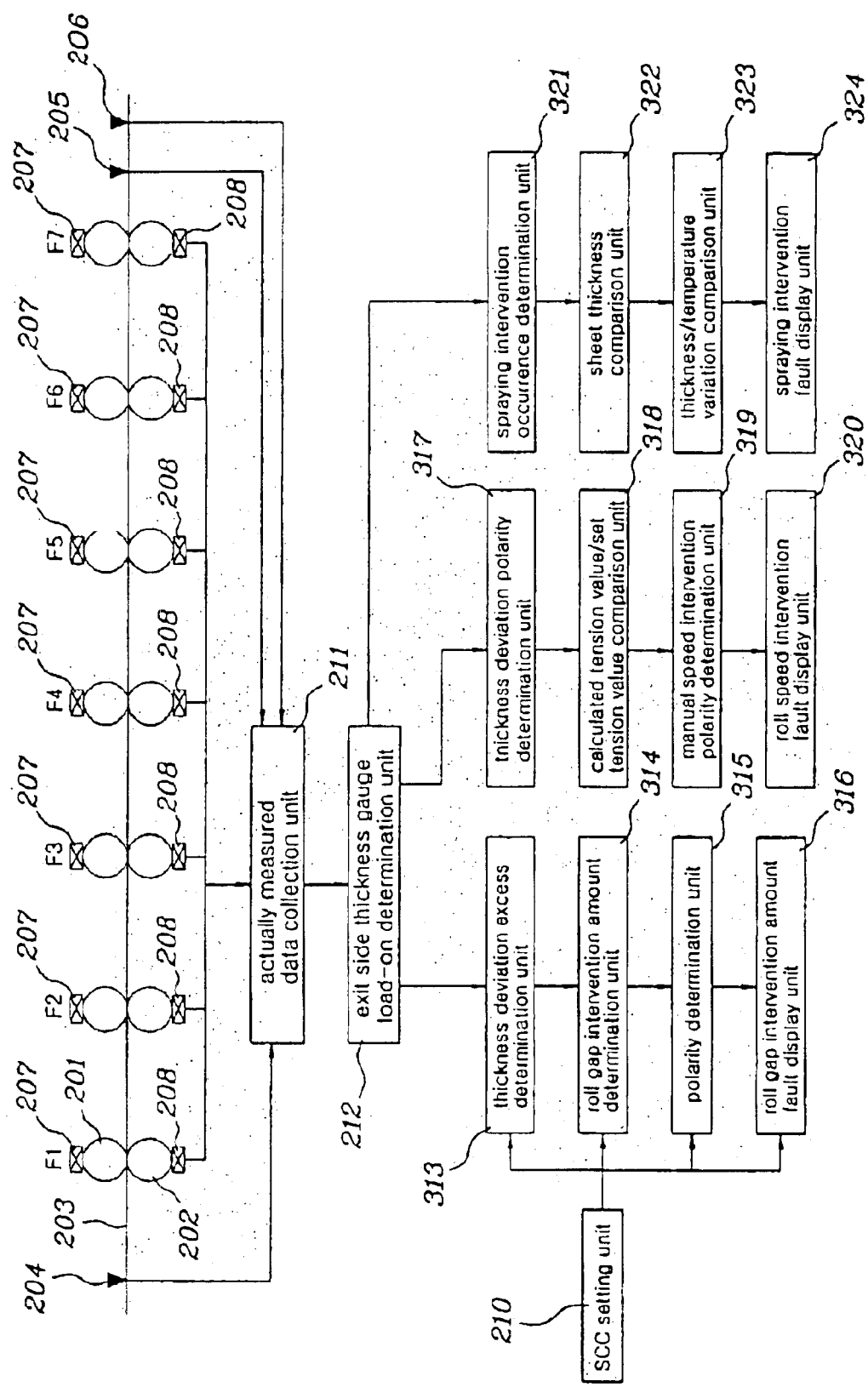
FIG. 4 is a schematic configuration diagram showing an operator manipulation evaluation unit of the apparatus for diagnosing faults in hot strip finishing rolling.

FIG. 4 is a schematic configuration diagram showing the operator manipulation evaluation unit of the apparatus for diagnosing faults in hot strip finishing rolling, which is described in detail below.

The operator manipulation evaluation unit 218 shown in FIG. 4 utilizes data from the SCC setting unit 210 operated at the time of the occurrence of the thickness fault to apply set values, such as a target thickness, a target load, a roll speed and a roll gap, the actually measured data collection unit 211 for collecting actually measured data from a thickness gauge 205, an entrance side temperature gauge 204, an exit side temperature gauge 206 and a roll gap measurement sensor 208, and an exit side thickness gauge loaded-on determination unit 212 for determining whether an exit side thickness gauge is loaded on.

The SCC setting unit 210, the thickness gauge 205, the entrance side temperature gauge 204, the exit side temperature gauge 206 and the roll gap measurement sensor 208 are the same as those of FIG. 2.

The operator manipulation evaluation unit 218 may be divided into a roll gap intervention determination module, a speed intervention determination module and a spraying intervention determination module, which are described below.

The roll gap intervention determination module includes a thickness deviation excess determination unit 313 for determining whether a thickness deviation is larger than a control tolerance, a roll gap intervention amount determination unit 314 for determining how much larger the amount of roll gap intervention of the operator is than the corresponding preset value set in the SCC setting unit 210, and calculating and evaluating the amount of thickness variation if the amount of roll gap intervention is larger. The roll gap intervention determination module further includes a polarity determination unit 315 for determining whether the polarity of the amount of roll gap intervention coincides with the polarity of the amount of thickness variation, and a roll gap intervention amount fault display unit 316 for displaying a roll gap intervention amount fault if it is determined that the roll gap intervention amount fault has occurred.

The speed intervention determination module is a module for determining whether a speed intervention fault has occurred, and includes a thickness deviation polarity determination unit 317 for determining whether the thickness deviation has a (−) sign, a calculated tension value/set tension value comparison unit 318 for calculating an inter-stand tension and comparing the calculated inter-stand tension value with an inter-stand tension value set in the SCC setting unit 210, a manual speed intervention polarity determination unit 319 for determining whether a variation in the amount of manual speed intervention has a (−) sign, and a roll speed intervention fault display unit 320 for displaying a roll speed intervention fault if it is determined that the roll speed intervention fault has occurred.

The spraying intervention fault module includes a spraying intervention occurrence determination unit 321 for determining whether spraying intervention has occurred, a sheet thickness comparison unit 322 for calculating a sheet thickness using a stand load and determining whether the calculated sheet thickness is similar to an actually measured sheet thickness, a thickness/temperature variation comparison unit 323 for the pattern of the thickness variation coincides with the pattern of the exit side temperature variation, and a spraying intervention fault display unit 324 for displaying a spraying intervention fault if the spraying intervention fault has occurred.

Figure 5A:
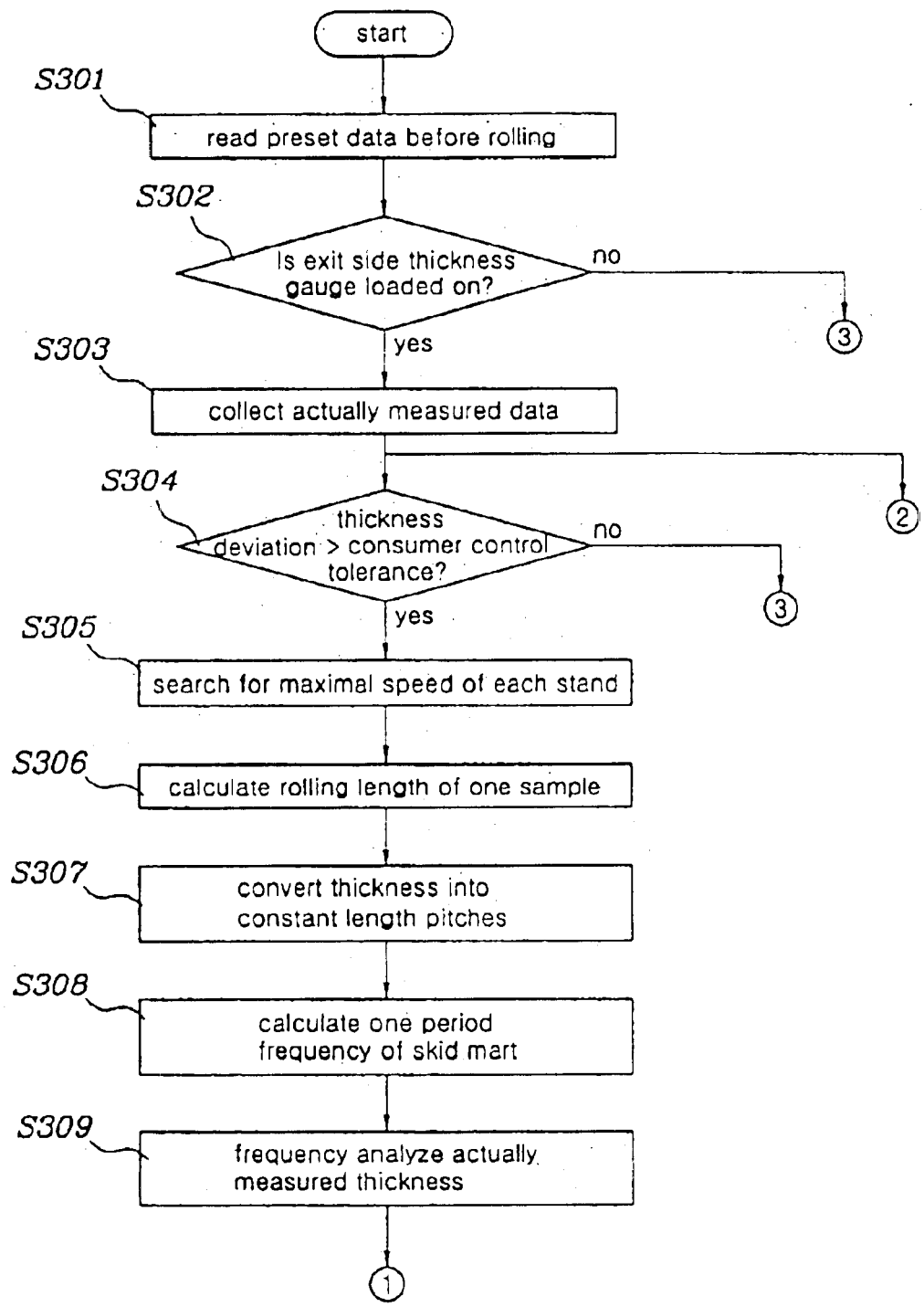
Figure 5B:
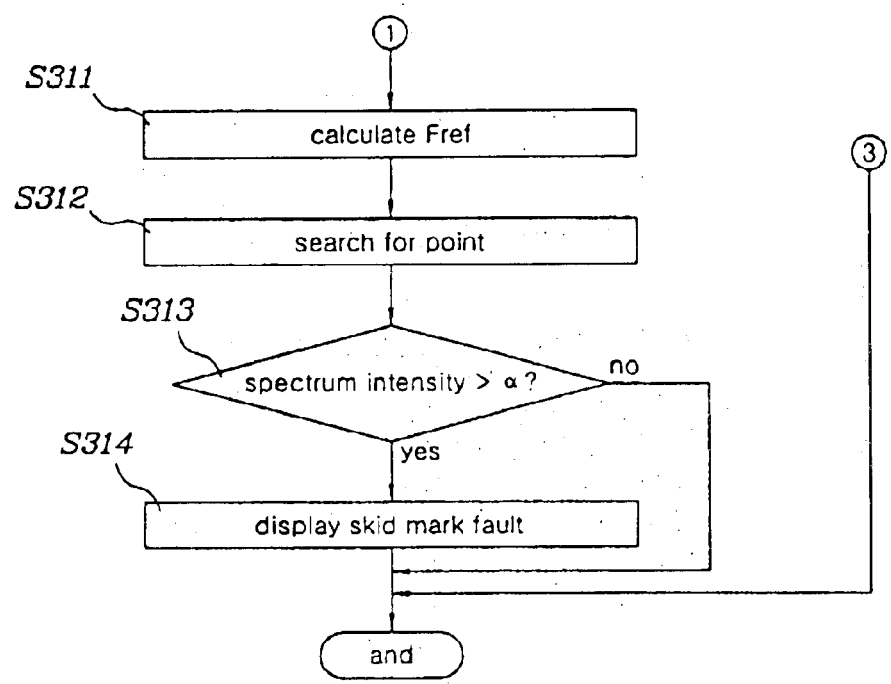
Figure 5C:
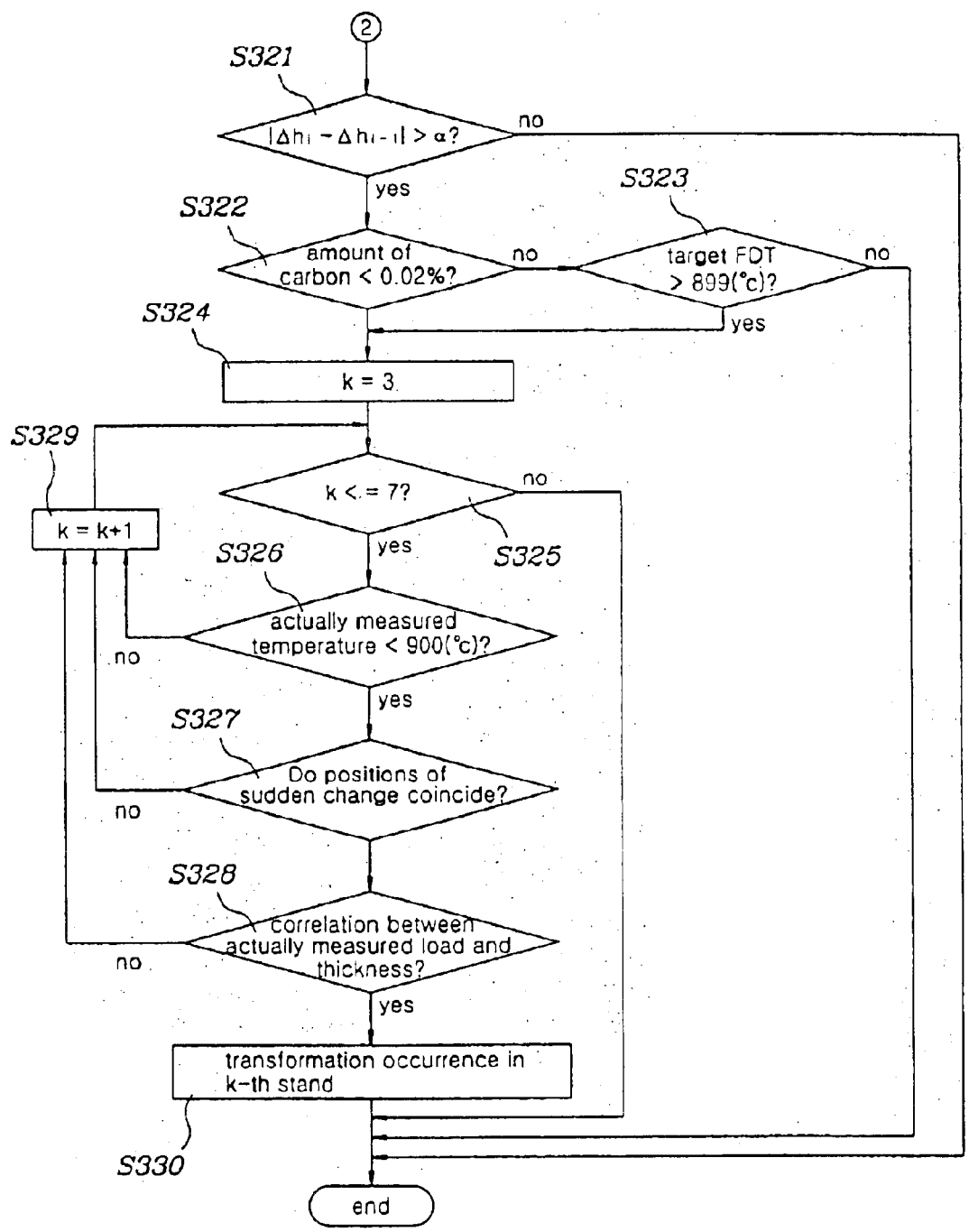

FIGS. 5a to 5c are flowcharts showing the process of diagnosing material faults in the method of diagnosing faults in hot strip finishing rolling in accordance with the present invention. FIGS. 5a and 5b are flowcharts showing a process of diagnosing a skid mark fault. FIG. 5c is a flowchart showing a process of diagnosing a transformation occurrence fault.

Figure 6:
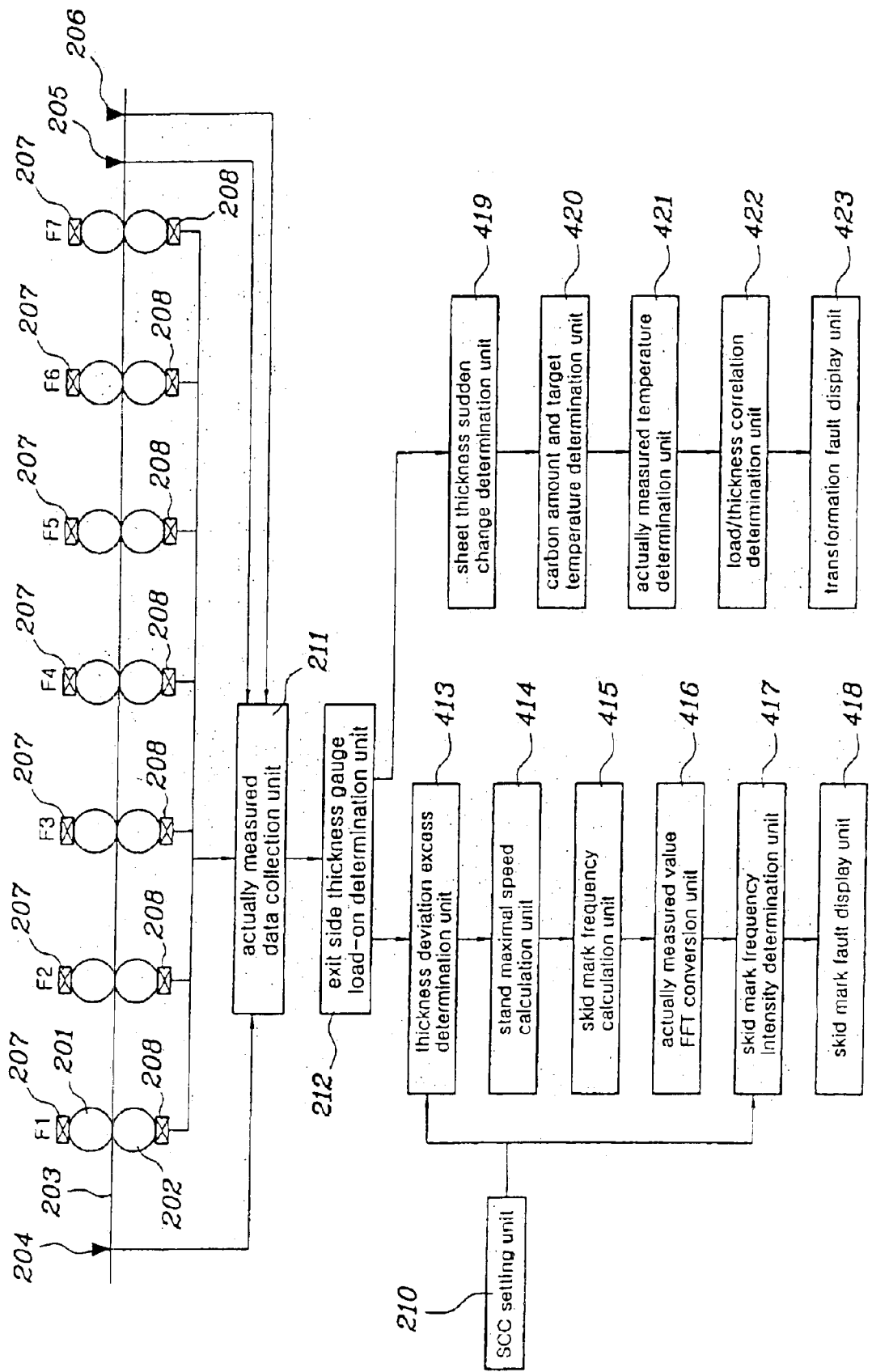
FIG. 6 is a schematic configuration diagram showing a material fault determination unit of the apparatus for diagnosing faults in hot strip finishing rolling.

Referring to FIGS. 5a and 5b and 6, the process of diagnosing the skid mark fault is described below.

After values set according to rolling conditions, such as a target thickness, a target load, a roll speed and a roll gap, are read from an SCC setting unit 210 at step S301, it is determined whether a thickness signal of a rolled sheet 203 is applied from an exit side thickness gauge 205 located on the exit side of a stand, that is, whether the exit side thickness gauge 205 is loaded on at step S302. If the rolled sheet 203 is detected, algorithms presented by the present invention are performed.

At step S303, actually measured data are collected from a thickness gauge 205, an exit side temperature gauge 206, a rolling load measurement sensor 207, and a roll gap measurement sensor 208.

The processes shown in FIGS. 5a and 5c are sub-steps that correspond to step S112 to be performed after steps S101 to S110. These processes are performed after a thickness fault is detected, and are used to determine whether a material fault has occurred using the data collected at step S303.

Subsequently, at step S304, it is determined whether the thickness deviation collected from the thickness gauge 205 is larger than a consumer control tolerance. This is performed because, if the collected thickness deviation is larger than the consumer control tolerance, it is determined that a thickness fault has occurred.

If, as the result of the determination at step S304, the thickness deviation is equal to or smaller than the consumer control tolerance, the process ends. If the collected thickness deviation is larger than the consumer control tolerance, the maximal speed of each stand is searched for at step S305. Since the frequency analysis is not easy to perform because the speed of the hot strip finishing mill varies, the above step is performed to allow the frequency analysis to be easily performed in a section ranging from the maximal speed to a certain interval.

Subsequently, at step S306, the rolling length of a sample is calculated using the maximal speed searched for at step S305 and, thereafter, at step S307, a sheet thickness is converted into constant length pitches based on the calculated rolling length. These steps are performed because the performance of the frequency analysis by the time rather than by the length is easy and results in accurate results.

At step S308, the one period frequency of a skid mark is calculated. This frequency is used to obtain a frequency that coincides with a frequency to be calculated at the time of a thickness frequency analysis of a rolled plate.

Subsequently, at step S309, a frequency analysis of an actually measured thickness values is performed, and at step S311, frequencies corresponding to spectral intensities obtained from the results of the frequency analysis of the actually measured thickness values are calculated. These frequencies are referred to as "Fref."

At step S312, a point where the frequency of the one period of the skid mark calculated at step S308 coincides with one of the frequencies corresponding to the spectrum intensities is searched for. In this case, if a coincident frequency is present, the coincident frequency is a skid mark frequency.

The step S313 is the step of calculating the magnitude of the spectrum intensity of each of the calculated frequencies Fref and determining whether the calculated magnitude is equal to or larger than a preset magnitude, which is performed using the following Determination equation 4 (skid mark fault determination equation).

[Determination Equation 4]

(1) spectrum intensity corresponding to Fref≧α: skid mark fault (2) spectrum intensity corresponding to Fref<α: no skid mark fault In this case, a is a value preset in the SCC setting unit 210.

Subsequently, at step S314, a skid mark fault is displayed if it is determined that the skid mark fault has occurred.

FIG. 5c shows the process of diagnosing the transformation occurrence fault, which is described in detail below.

At step S321, it is determined whether there is the portion of a rolled sheet where a sheet thickness is suddenly changed (calculation of sheet thickness variation).

$$|\Delta h_i - \Delta h_{i-1}| > \alpha$$

where α is a preset value set in the SCC setting unit 210 (in this embodiment, set to approximately 50 μm), and i is the number of samplings.

Steps S322 and S323 represent conditions for the occurrence of the transformation in a stand, which is performed using the following Determination equation 5 (conditional expression).

[Determination Equation 5]

(1) in the case where the amount of carbon is equal to or less than 0,02%, or (2) in the case where a target temperature is equal to or higher than 900° C., and an actually measured temperature is equal to or lower than 900° C.

If one of the conditions described in Determination equation 1 is fulfilled, the process proceeds to steps S324 and S325. At steps S324 and S325, it is determined which stand transformation continuously has occurred. In the present embodiment, there is described an example in which the transformation has started from a third one of seven stands. In this case, k represents a stand number.

At step S326, it is determined whether the actually measured temperature of each stand is equal to or lower than 900° C. This step is performed for the same reason as the Determination equation 5. That is, if the condition of step S326 is not fulfilled, a next stand is checked.

If, as the result of the determination at step S326, the actually measured temperature is equal to or lower than 900° C., it is determined whether a k-th stand coincides with the position of the sudden change of a sheet thickness. If, as the result of the determination at step S327, the k-th stand coincides with the position of the sudden change of the sheet thickness, there is a great possibility that transformation will occur.

Subsequently, at step S328, by comparing actually measured load and thickness data, it is determined whether there is a correlation between the two data. If there is a correlation between the two data, it is determined that the transformation has occurred in a corresponding stand at step S330, and, thereafter, the process ends.

FIG. 6 is a schematic configuration diagram showing the material fault determination unit 219 of the apparatus for diagnosing faults in hot strip finishing rolling, which is described in detail below.

The material fault determination unit 219 shown in FIG. 6 utilizes data from the SCC setting unit 210 operated at the time of the occurrence of the thickness fault to apply set values, such as a target thickness, a target load, a roll speed and a roll gap, the actually measured data collection unit 211 for collecting actually measured data from the thickness gauge 205, the entrance side temperature gauge 204, the exit side temperature gauge 206 and the roll gap measurement sensor 208, and the exit side thickness gauge loaded-on determination unit 212 for determining whether an exit side thickness gauge is loaded on.

The SCC setting unit 210, the thickness gauge 205, the entrance side temperature gauge 204, the exit side temperature gauge 206 and the roll gap measurement sensor 208 are the same as those of FIG. 2.

The material fault determination unit 219 may be divided into a skid mark fault determination module and a transformation occurrence fault determination module.

First, the skid mark fault determination module is described below.

The skid mark fault determination module includes a thickness deviation excess determination unit 413 for determining whether a thickness deviation is larger than a consumer control tolerance, a stand maximal speed calculation unit 414 for calculating the maximal speed of each stand, a skid mark frequency calculation unit 415 for calculating the rolling length of a sample using the maximal speed, converting a sheet thickness into constant length pitches based on the calculated rolling length, and calculating the one period frequency of a skid mark, an actually measured value FFT conversion unit 416 for FFT-converting an actually measured thickness, a skid mark frequency intensity determination unit 417 for determining whether a skid mark fault has occurred by calculating frequencies corresponding to spectrum intensities, searching the calculated frequencies for a frequency coinciding with a skid mark frequency and evaluating the intensity of the searched frequency, and a skid mark fault display unit 418 for outputting the skid mark fault.

The transformation occurrence fault determination module includes a sheet thickness sudden change determination unit 419 for determining whether there is an interval where a sheet thickness is suddenly changed, a carbon amount and target temperature determination unit 420 for determining whether there is a possibility that a transformation fault occurs using the amount of carbon and the preset target temperature value, an actually measured temperature determination unit 421 for determining whether an actually measured temperature satisfies a condition for the occurrence of transformation, a load/thickness correlation determination unit 422 for determining whether there is the correlation between an actually measured load and a thickness by determining whether each stand coincides with the position of the sudden change of a sheet thickness, and a transformation fault display unit 423 for displaying the occurrence of transformation if the occurrence of transformation has occurred.

Figure 7A:
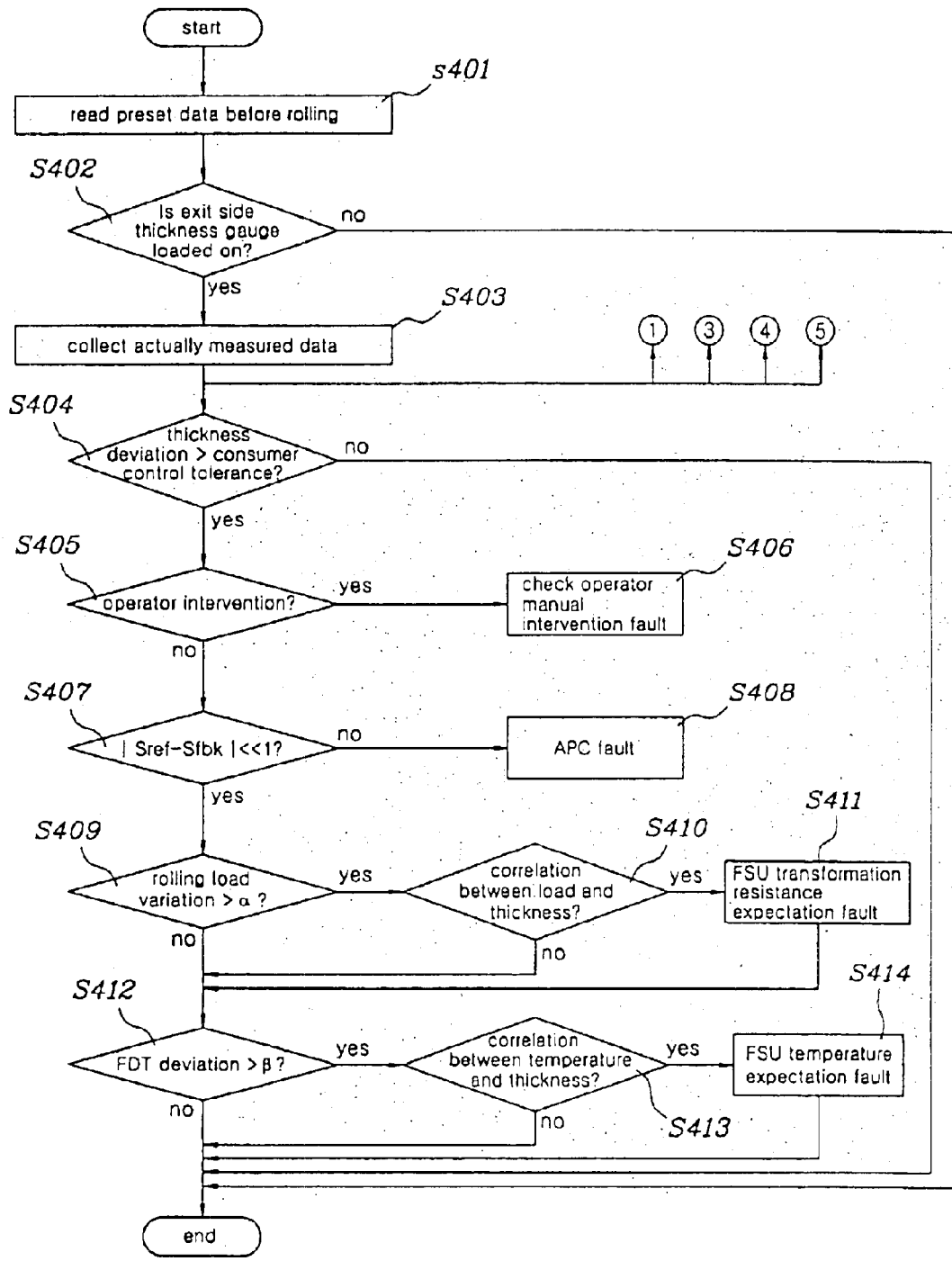
Figure 7B:
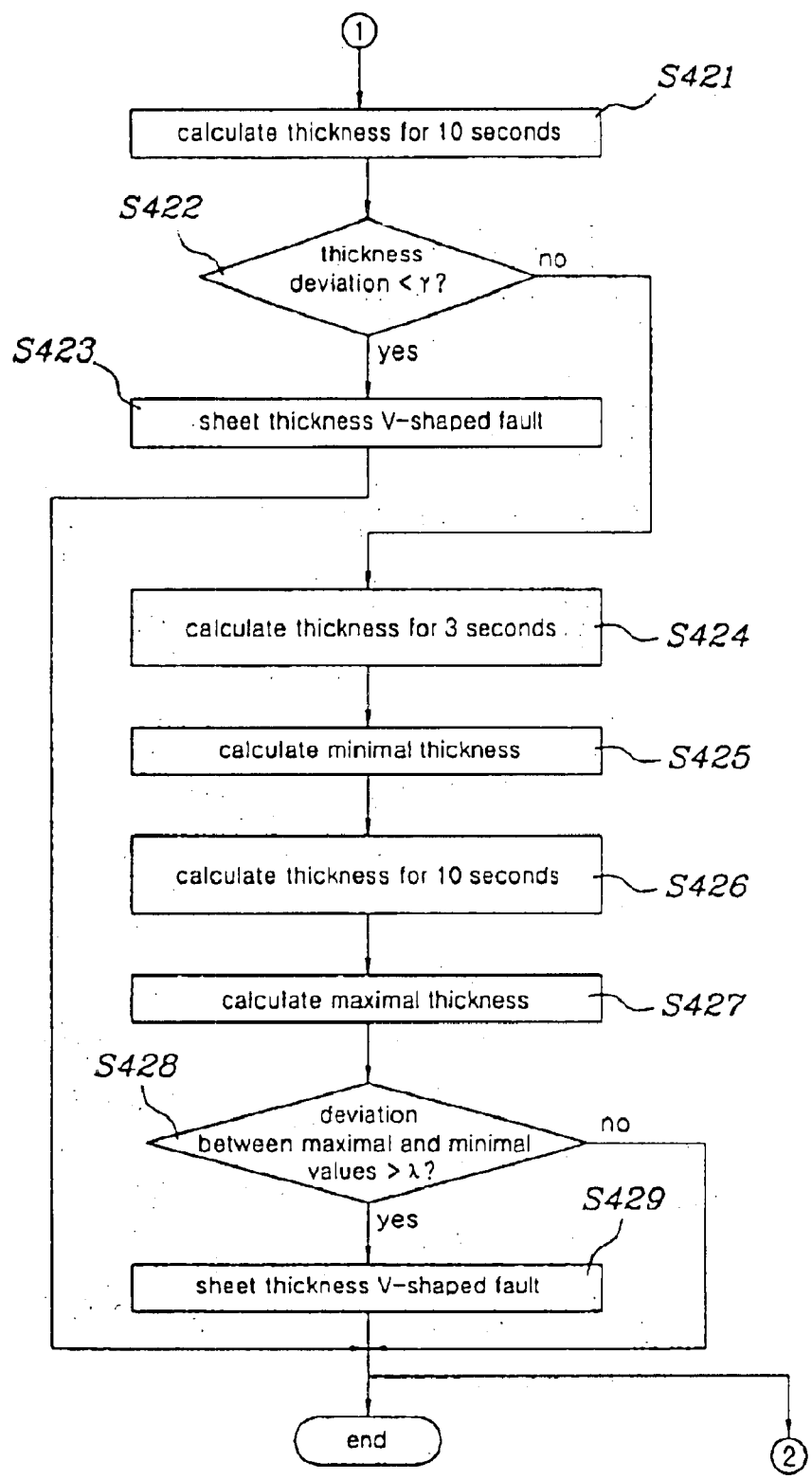
Figure 7C:
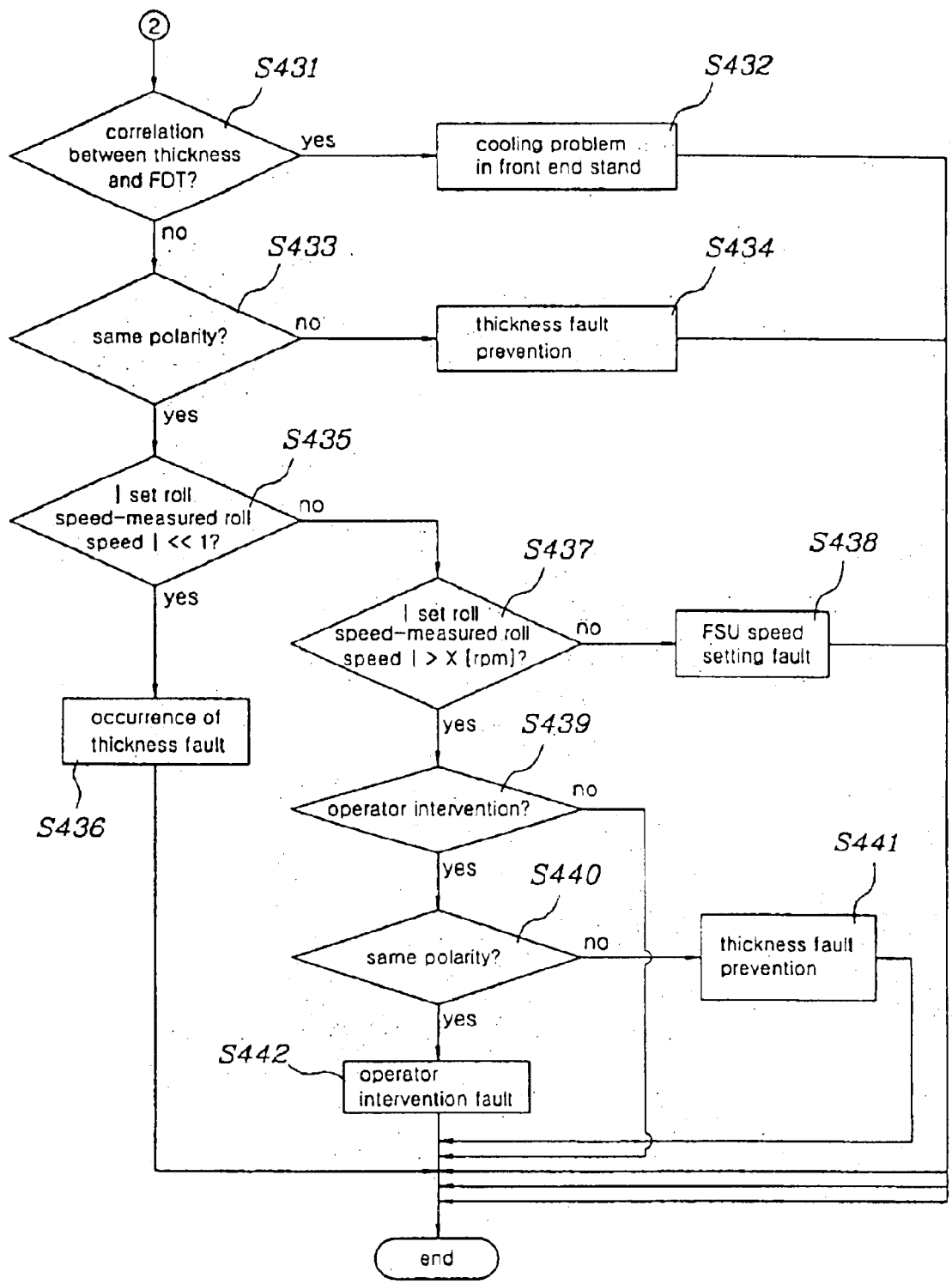
Figure 7D:
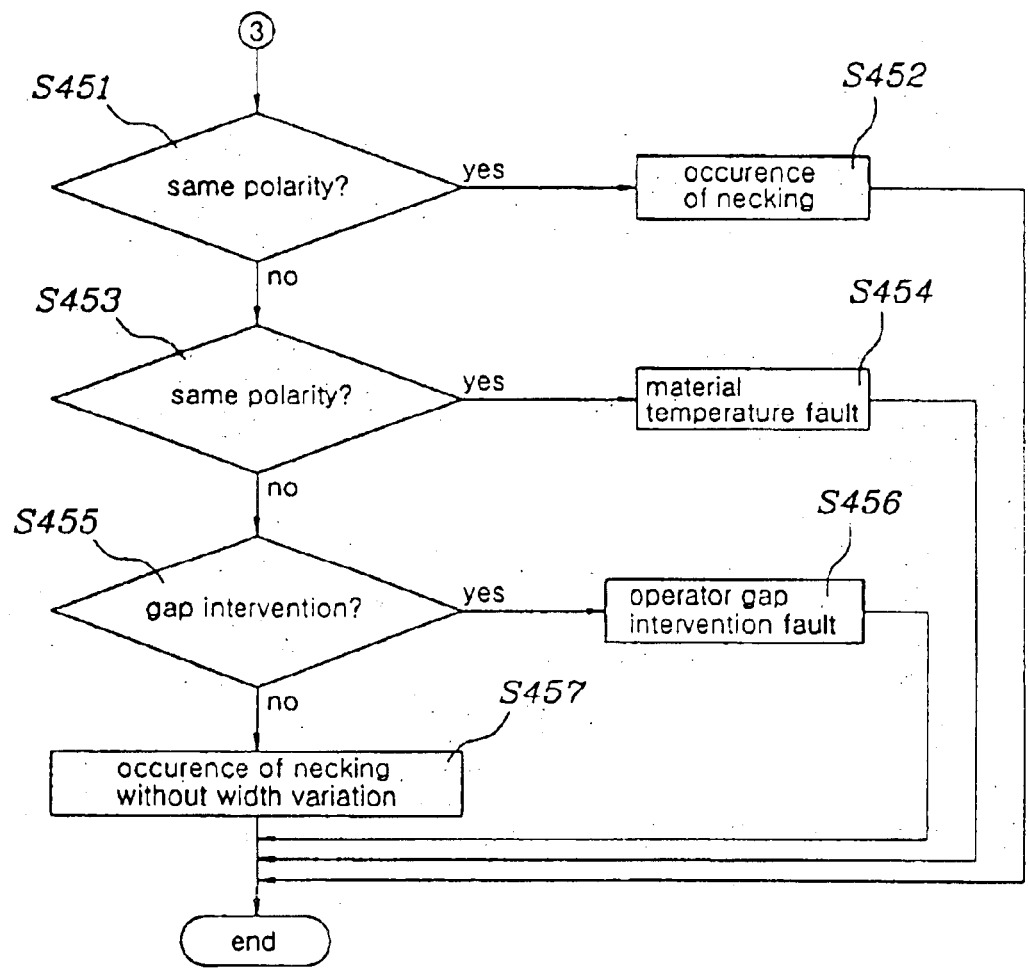
Figure 7E:
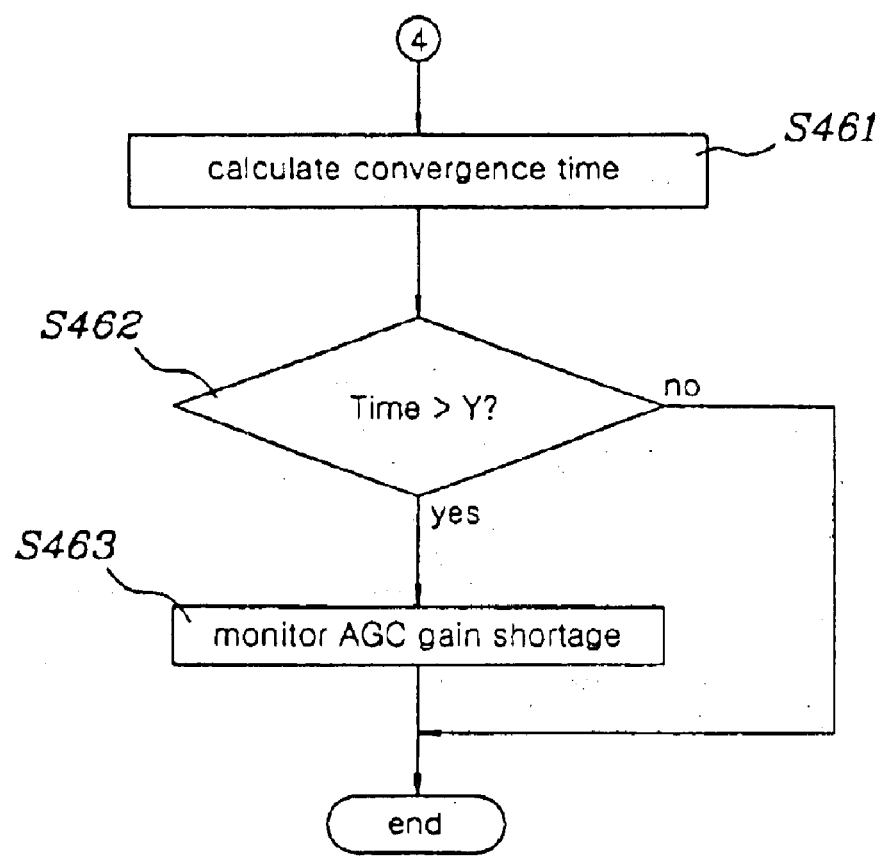
Figure 7F:
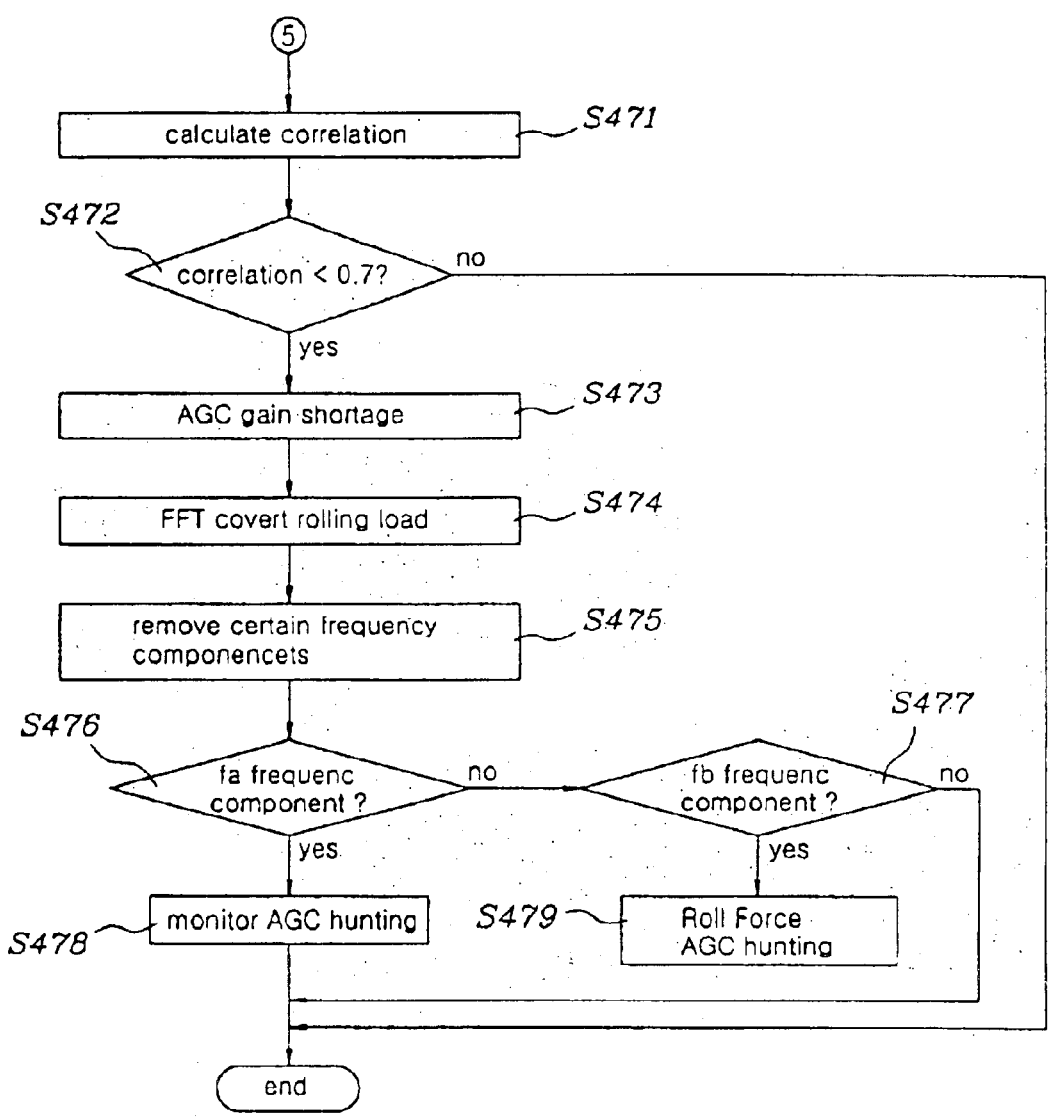

FIGS. 7a to 7f are flowcharts showing the process of diagnosing a control fault in the method of diagnosing faults in hot strip finishing rolling in accordance with the embodiment of the present invention. FIG. 7a is a flowchart showing a process of diagnosing an FSU fault, FIG. 7b is a flowchart showing a process of determining whether a front end part V-shaped detect has occurred, FIG. 7c is a flowchart showing a process of determining whether a V-shaped defect has occurred, FIG. 7d is a flowchart showing a process of determining whether necking has occurred, FIG. 7e is a flowchart showing a process of determining whether a AGC gain fault has occurred, and FIG. 7f is a flowchart showing a process of determining whether an AGC controller fault has occurred.

Referring to FIG. 7a, the process of determining whether the FSU fault has occurred.

After values set according to rolling conditions, such as a target thickness, a target load, a roll speed and a roll gap, are read from the SCC setting unit 210 at step S401, it is determined whether a thickness signal of a rolled sheet 203 is applied from the exit side thickness gauge 205 located on the exit side of a stand, that is, whether the exit side thickness gauge 205 is loaded on at step S402. If the rolled sheet 203 is detected, algorithms presented by the present invention are performed.

At step S403, actually measured data are collected from the thickness gauge 205, the entrance side temperature gauge 204, the exit side temperature gauge 206, the rolling load measurement sensor 207, and the roll gap measurement sensor 208.

The processes shown in FIGS. 7a to 7f are sub-steps that correspond to step S114 to be performed after steps S101 to S110. These processes are performed after a thickness fault is detected, and are used to determine whether a control fault has occurred using the data collected at step S403.

Subsequently, at step S404, it is determined whether a thickness deviation collected from the thickness gauge 205 is larger than a consumer control tolerance. This is performed because, if the collected thickness deviation is larger than the consumer control tolerance, it is determined that a thickness fault has occurred.

If, as the result of the determination at step S404, the thickness deviation is equal to or smaller than the consumer control tolerance, the process ends. If the collected thickness deviation is larger than the consumer control tolerance, it is determined whether the roll gap intervention of the operator has occurred at step S405. Step S405 is performed using the following Equation 5 (equation for determining whether the roll gap intervention of the operator has occurred).

$|S_{both,i} - S_{i-1}| > X(\mu m)$: presence of operator roll gap intervention (5)

In this case, $S_{both,i}$ is the amount of manual roll intervention of the operator in an i-th sample, and X is a preset value in the SCC setting unit 210 and is set to 10 to 50 μm in the present embodiment.

If, as the result of the determination at step S405, the manual intervention of the operator has not occurred, an algorithm of determining whether an operator manual intervention fault has occurred is performed at step S406.

If, as the result of the determination at step S405, the manual intervention of the operator has not occurred, it is determined whether a thickness fault caused by an Automatic Position Controller (APC) has occurred at step S407, which is performed using the following Equation 6.

$|S_{ref,i} - S_{fbk,i}| << 1$: no APC fault (6)

where $S_{ref,i}$ is a set roll gap value in an i-th sample, and $S_{fbk,i}$ is an actually measured roll gap value in the i-th sample.

If, as the result of the determination at step S407, the deviation between the set roll gap value and the actually measured roll gap value converges into 0, it is determined that an APC fault has not occurred. If not, it is determined that the APC fault has occurred, and an APC fault logic is performed at step S408.

Step S409 is the step of determining whether the deviation of a rolling load is greater than a preset value a. In this case, α is a preset value in the SCC setting unit 210.

If, as the result of the determination at step S409, the deviation is greater than the preset value a, it is determined whether there is a correlation between the load of the front end part and the sheet thickness at step S410. Step S410 is performed using the following Determination equation 6.

[Determination Equation 6]

(1) If the sheet thickness is (−) and the load variation is (+), it is determined that the correlation is great.

(2) If the sheet thickness is (+) and the load variation is (+), it is determined that the correlation is great.

(3) In other cases, it is determined that there is no correlation.

If, as the result of the determination at step S410, there is the correlation, there may be a fault in the FSU deformation resistance expectation equation at step S411, so that the step of examining the equation model for the fault is performed.

In the meantime, if, as the result of the determination at step S409, the rolling load deviation is equal to or smaller than the preset value α, or if, as the result of the determination at step S410, there is no correlation, it is determined whether an actually measured exit side temperature is higher than a preset value β at step S412. In this case, β is a preset value set in the SCC setting unit 210.

If, as the result of the determination at step S412, the actually measured exit side temperature is higher than β, it is determined whether there is a correlation between the temperature and the sheet thickness at step S413. Step S413 is performed using the following Determination equation 7 (method of determining correlation between thickness and temperature variation).

[Determination Equation 7]

(1) If the temperature deviation varies greatly, it is determined that there is a great correlation.

(2) In other cases, there is no correlation.

If, as the result of the determination at step S413, there is a great correlation, there may be a fault in the FSU temperature expectation model, so that the step of examining the equation model for the fault is performed.

Referring to FIG. 7b, the process of determining whether the V-shaped thickness fault has occurred is described below.

Step S421 is the step of obtaining actually measured thicknesses for about 10 seconds from a point when the thickness gauge is turned on. The actually measured obtained at step S421 are used as data on the determination at step S421.

Subsequently, at step S422, it is determined whether the thickness deviation of the front end part is smaller than a preset value γ. In this case, γ is a preset value set in the SCC setting unit 210, which is usually set to a value in the range of −50 to −100 μm. If the thickness deviation is smaller than γ, it is determined that the sheet thickness of the front end part has the V-shaped fault, so that it is determined that V-shaped fault has occurred in the front end part at step S423, and the process ends.

If, as the result of the determination at step S422, the thickness deviation is not smaller than γ, the V-shaped fault has occurred in the front end part. Accordingly, actually measured thickness values are obtained for a preset period (in the present embodiment, 3 seconds) from a point when the thickness gauge is turned on at step S424, a minimal thickness value is obtained from the actually measured thickness values obtained for the preset period at step S425, and actually measured thicknesses are obtained for a preset period (in the present embodiment, 10 seconds) from a point when the minimal thickness value is obtained at step S426.

Subsequently, at step S427, a maximum thickness value is obtained from the actually measured thickness values in the same manner as the minimal value is obtained at steps S424 and S426. At step S428, the deviation between the minimal thickness value obtained at step S425 and the maximum thickness value is calculated, and it is determined whether the calculated deviation is larger than γ. In this case, γ is a preset value in the SCC setting unit 210.

If, as the result of the determination at step S428, the deviation is larger than γ, it is finally determined that the V-shaped fault has occurred in the sheet thickness of the front end portion at step S429.

The reason why V-shaped faults are dealt with using the two algorithms is that there are two types of V-shaped faults: a first type of V-shaped faults in which thickness deviations lie in the range of 0 to −50 μm and a second type of V-shaped faults in which thickness deviations lie in the range of 30 or 50 μm to −30 or −40 μm.

FIG. 7c is a flowchart showing the process of diagnosing the cause of a fault, which is described in detail below.

At step S431, it is determined whether there is a correlation between an actually measured thickness and an actually measured temperature. Step S431 is performed using the flowing Determination equation 7. If, as the result of the determination at step S432, there is the correlation, it is determined that there is a fault in the cooling of a front end stand at step S432, and the process ends.

If, as the result of the determination at step S432, there is no correlation, it is determined whether a V-shaped fault and the roll gap intervention of the operator have the same polarity at step s433. If, as the result of the determination at step S433, the two data do not have the same polarity, it is determined that a thickness fault has been prevented by the roll intervention of the operator at step S434, and the process ends.

If, as the result of the determination at step S433, the two data have the same polarity, it is determined whether a fault in a roll speed has occurred at step S435. The step S435 is performed using the following equation 8 (method of determining whether roll speeds converge).

[Determination Equation 8]

$$|\Delta V_{R,ref} - \Delta V_{R,fbk}| \ll 1: \text{roll speeds converge (not problem of motor control panel)}$$

where $\Delta V_{R,ref}$ is a preset roll speed, and $\Delta V_{R,fbk}$ is an actually measured value (feedback value).

If, as the result of the determination at step S435, the roll speeds converge, it is determined that a thickness fault attributable to a gap setting has occurred at step S436, and the process ends.

If, as the result of the determination at step S435, the roll speeds do not converge, the deviation between a set roll speed value and an actually measured roll speed value is evaluated at step S437. If the deviation is equal to or smaller than X rpm, it is determined that there is a fault in a FSU speed setting at step S438, and the process ends. In this case, X is a preset value in the SCC setting unit 210.

If, as the result of the determination at step S437, the deviation is larger than X rpm, it is determined whether the roll speed intervention of the operator has occurred at step S439. Step S439 is performed using the following equation 7.

$$|\Delta V_{SCSV,i} - \Delta V_{SCSV,i-1}| > X(\text{mpm}): \text{presence of manual speed intervention of operator} \quad (7)$$

where $\Delta V_{SCSV,i}$ is the amount of manual roll speed intervention of the operator, and X is a preset value in the SCC setting unit 210, which is set to 10 to 20 mpm in the present embodiment.

If, as the result of the determination at step S439, the intervention of the operator has not occurred, the process ends. If the intervention of the operator has occurred, it is determined whether the actually measured thickness and an actually measured tension have the same polarity at step S440. If the actually measured thickness and the actually measured tension have the same polarity, this means that a thickness fault can be prevented by the manual speed intervention of the operator. If the two data have the same polarity, this means that the thickness fault has been caused by the manual speed intervention of the operator.

FIG. 7d is a flowchart showing the method of diagnosing the necking, which is described in detail below.

Since necking chiefly occurs between a specific stand and a Down Coiler (DC), it is determined whether a thickness variation and a thickness variation have the same polarity when the DC is turned on at step S451. If, as the result of the determination at step S451, the two data have the same polarity, this means that the necking has occurred. Accordingly, the occurrence of the necking is displayed at step S452, and the process ends.

Step S453 is the step of analyzing the correlation between a temperature variation and the thickness variation if the thickness variation and the thickness variation do not have the same polarity. Step S453 is performed using Determination equation 7. If these two data have the correlation, it is determined that a temperature fault has occurred in a material, the temperature fault is displayed, and the process ends.

If there is no correlation between the thickness and the temperature, it is determined whether the roll gap intervention of the operator has occurred in the stand where the thickness variation has occurred at step s455. Step S455 is performed using Equation 5. If the roll intervention has occurred, an operator roll gap intervention fault is displayed and the process ends.

If the roll gap intervention has not occurred at a point when the thickness variation occurred, it is determine that the necking has occurred without the thickness variation, the occurrence of the necking is displayed, and the process ends.

FIG. 7e is a flowchart showing a process of determining whether an AGC gain fault has occurred, which is described in detail below.

Step S461 is the step of calculating the time that the actually measured thickness value takes to converge into a reference value, which is performed using the following Equation 8.

$$t \text{ fulfilling } |h_{ref,i} - h_{fbk,i}| < \epsilon \text{ is selected as convergence period} \quad (8)$$

where ε is a preset value in the SCC setting unit 210, which is set to a value less than 5 μm.

Step S462 is the step of determining whether the convergence period is larger than Y. In this case, Y designates a maximal time that the actually measure thickness value takes to converge into the target thickness value, which is a preset value in the SCC setting unit 210.

Step S463 is the step of determining that the AGC gain fault has occurred if the convergence period is longer than Y.

FIG. 7f is a flowchart showing the process of determining whether the AGC controller fault has occurred, which is an algorithm of determining whether the hunting of the AGC has occurred when the thickness fault has occurred.

Step S471 is the step of evaluating the correlation between the finishing rolling exit side temperature and the actually measured thickness, which is performed using the following Equation 9.

$$C_{h,T} = \frac{C_h}{C_T} * 100 \qquad (9)$$

where $0 < C_{h,T} < 1$ is fulfilled.
Furthermore, $$C_h = \frac{\Delta h}{100}, C_T = \frac{\Delta T}{15}$$

and $0 < C_h < 1$, $0 < C_T < 1$ are fulfilled.

However, $C_{h,T}$ a cross correlation coefficient between an actually measured thickness and an actually measured temperature, $C_h$ is the auto correlation coefficient of the actually measured thickness and $C_T$ is the auto correlation coefficient of the actually measured temperature.

Equation 9 is adopted in the present embodiment on the basis of an empirical equation stating that, when a temperature varies by 15° C., the actually measured thickness value varies by 100 μm. In Equation 9, when the actually measured thickness value is 100 μm or the actually measured temperature value is higher than 15° C., they are normalized to 100 μm and 15° C., respectively.

Step S472 is the step of determining whether the correlation calculated at step S471 is equal to or higher than a preset value. The low correlation between the two data is a cause of the controller gain shortage at step S473, so that the below-described step S474 is performed. In the present embodiment, the preset value is 0.7.

Step S474 is the step of frequency analyzing an actually measured rolling load in the body part so as to determining whether a thickness controller fault has occurred. Subsequently, at step S475, frequency components regarding the skid mark and roll eccentricity, which are generally and frequently involved in a frequency analysis, are removed from the data at step S475. Thereafter, at steps S476 and S477, it is determined whether the frequency components fa and fb of monitor AGC and roll force AGC are present. The frequency components fa and fb are values set in the SCC setting unit 210, which generally are 0.5 Hz and 1 Hz, respectively.

If the frequency of each AGC is detected after the frequency analysis, steps S478 and S479 of displaying hunting are performed, and the process ends.

Figure 8:
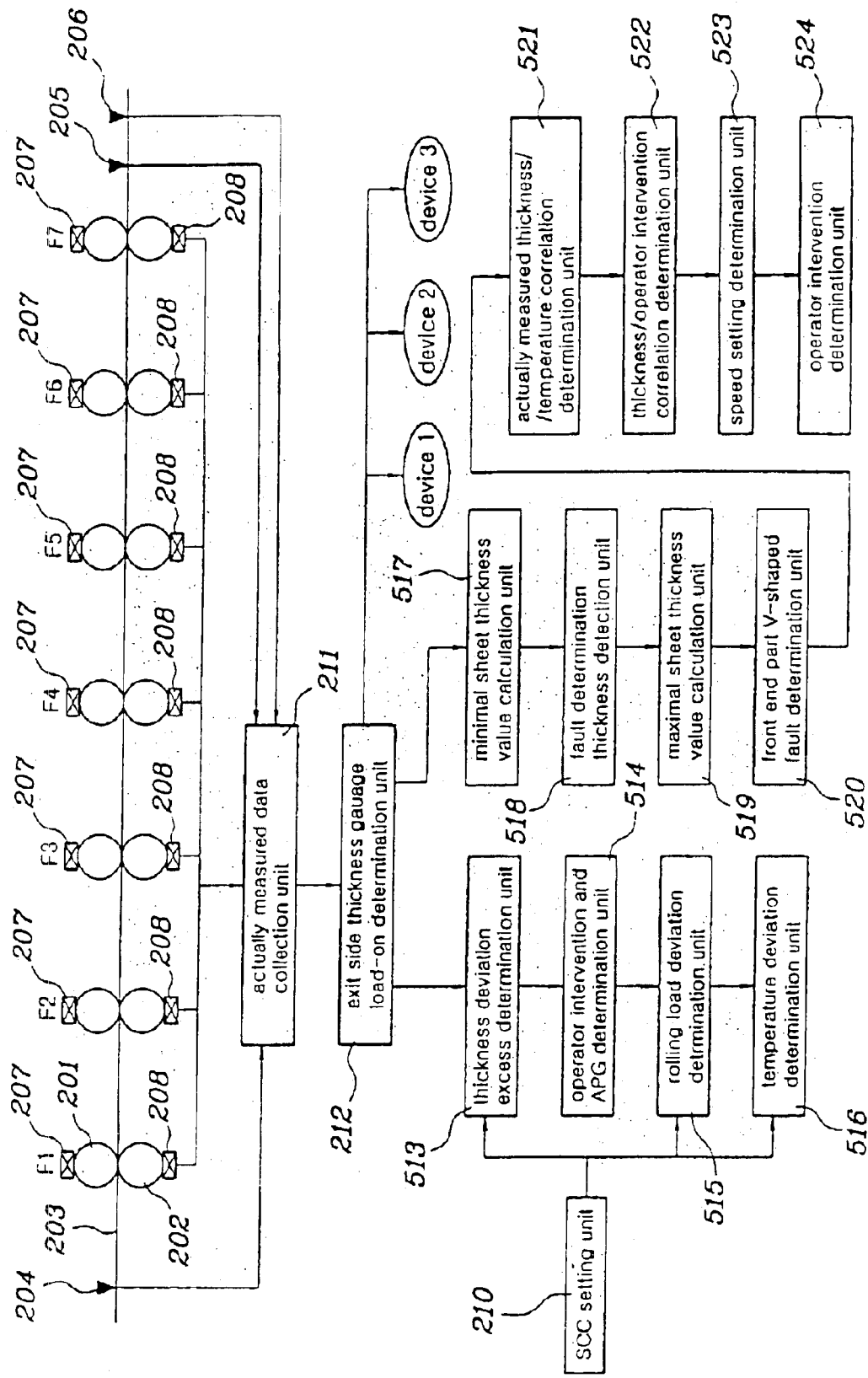
FIGS. 8 and 9 are schematic configuration diagrams showing a control fault determination unit of the apparatus for diagnosing faults in hot strip finishing rolling.
Figure 9:
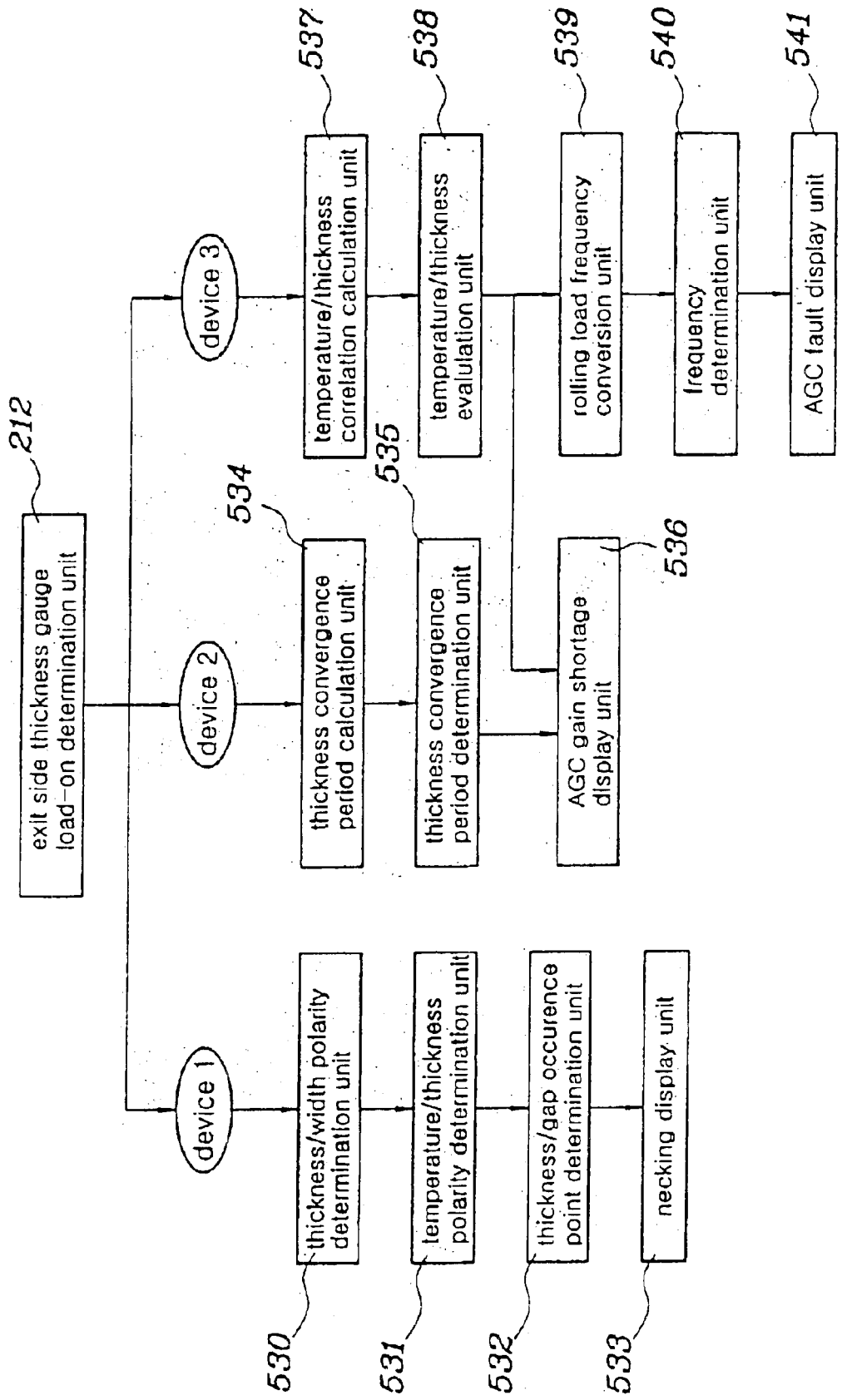

FIGS. 8 and 9 are schematic configuration diagrams showing the control fault determination unit 221 of the apparatus for diagnosing faults in hot strip finishing rolling, which is described in detail below.

The control fault determination unit 221 applied to the present invention utilizes data from the SCC setting unit 210 for applying preset target values, such as a target thickness, a target load, a roll speed and a roll gap, the actually measured data collection unit 211 for collecting actually measured data from the thickness gauge 205, the entrance side temperature gauge 204, the exit side temperature gauge 206, the rolling load measurement sensor 207 and the roll gap measurement sensor 208, and the exit side thickness gauge loaded-on determination unit 212 for determining whether an exit side thickness gauge is loaded on.

The SCC setting unit 210, the thickness gauge 205, the exit side temperature gauge 206, the rolling load measurement sensor 207 and the roll gap measurement sensor 208 are the same as those of FIG. 2.

The control fault determination unit 221 may be divided into an FSU fault diagnosis module, a front end part V-shaped fault and cause determination module, a necking occurrence diagnosis module, an AGC gain fault diagnosis module and an AGC controller fault diagnosis module, which is described in detail below.

First, the FSU fault diagnosis module is described below.

The FSU fault diagnosis module is constructed to include a thickness deviation excess determination unit 513 for determining whether a thickness deviation is larger than a consumer control tolerance, an operator intervention and APC determination unit 514 for determining whether an operator intervention and an APC fault have occurred if the thickness deviation is larger than the consumer control tolerance, a rolling load deviation determination unit 515 for determining whether a FSU deformation resistance expectation fault has occurred by determining whether there is the correlation between the load of the front end part and a sheet thickness if the rolling load deviation is larger than a preset value, and a temperature deviation determination unit 516 for determining whether a FSU temperature expectation fault has occurred by determining whether there is the correlation between an exit side temperature and an actually measured sheet thickness if an actually measured exit side temperature is larger than a preset value.

The front end part V-shaped fault and cause determination module is constructed to include a minimal sheet thickness value calculation unit 517 for calculating a minimal actually measured thickness value in a predetermined interval starting at a point when the thickness gauge is turned on by obtaining actually measured thickness values in the predetermined interval and determining whether a thickness deviation is larger than a preset value, a fault determination thickness detection unit 518 for detecting actually measured thickness values in a predetermined interval starting from a point where the minimal sheet thickness value is detected, a maximal sheet thickness value calculation unit 519 for calculating a maximal actually measured thickness value in the interval, a front end part V-shaped fault determination unit 520 for determining whether a front end part V-shaped sheet thickness fault has occurred by determining whether a deviation between the minimal actually measured thickness value and the maximal actually measured thickness value is larger than a preset value, an actually measured thickness/temperature correlation determination unit 521 for determining whether there is the correlation between the actually measured thickness value and the actually measured exit side temperature, a thickness/operator intervention correlation determination unit 522 for determining whether the V-shaped fault and the roll gap intervention of the operator have the same polarity, a speed setting determination unit 523 for determining whether the roll speeds converge, an operator intervention determination unit 524 for determining whether the roll speed intervention of the operator has occurred by determining whether the actually measured thickness value and the tension have the same polarity by determining the magnitude of the roll speed deviation and whether the manual roll speed intervention of the operator has occurred.

The necking occurrence diagnosis determination module is constructed to include a thickness/width polarity determination unit 530 for determining whether a width variation and a thickness variation have the same polarity at a point when the DC is turned on, and determining that necking has occurred if the two variations have the same polarity, a temperature/thickness polarity determination unit 531 for determining whether there is the correlation between a temperature variation and a thickness variation, and determining that a material and temperature has occurred if there is the correlation, a thickness/gap occurrence point determination unit 532 for determining whether an operator roll gap intervention fault has occurred by determining whether the roll gap intervention of the operator has occurred in a stand where the thickness variation occurred, and a necking display unit 533 for determining that necking has occurred without a width variation if the roll gap intervention has not occurred at the point when the thickness variation occurred.

The AGC gain fault diagnosis module is constructed to include a thickness convergence period calculation unit 534 for calculating the period that the deviation between the actually measured thickness value and the target thickness value takes to converge into a reference value, a thickness convergence period determination unit 535 for determining whether the convergence period is longer than a corresponding preset value set in the SCC setting unit, and an AGC gain shortage display unit 536 for determining that an AGC gain shortage has occurred if the convergence period is longer than the corresponding preset period and displaying the AGC gain shortage.

The AGC controller fault diagnosis module is constructed to include a temperature/thickness correlation calculation unit 537 for calculating the correlation between a finishing rolling exit side temperature and an actually measured thickness value, a temperature/thickness evaluation unit 538 for evaluating the magnitude of the correlation between the temperature and the thickness, a rolling load frequency conversion unit 539 for frequency converting the actually measured rolling load of the body part if the correlation is lower than a corresponding preset value, a frequency determination unit 540 for determining whether the frequency components of monitor AGC and roll force AGC are detected after removing frequency components regarding the skid mark and roll eccentricity that are generally and frequently involved in a frequency analysis of an actually measured finishing rolling thickness value, and an AGC fault display unit 541 for determining whether monitor AGC hunting or roll force AGC hunting has occurred if each of the frequencies is detected.

Figure 10A:
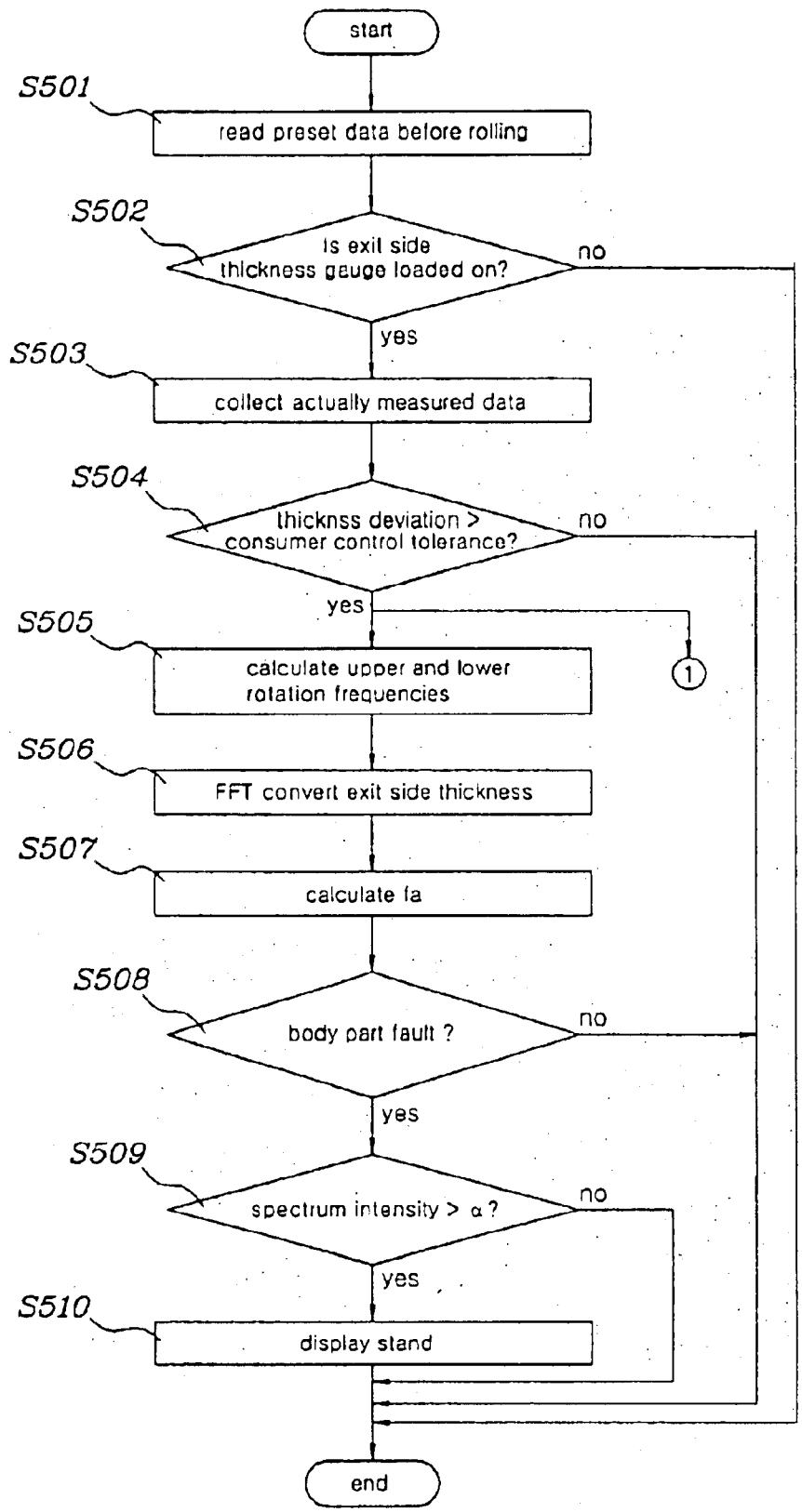
Figure 10B:
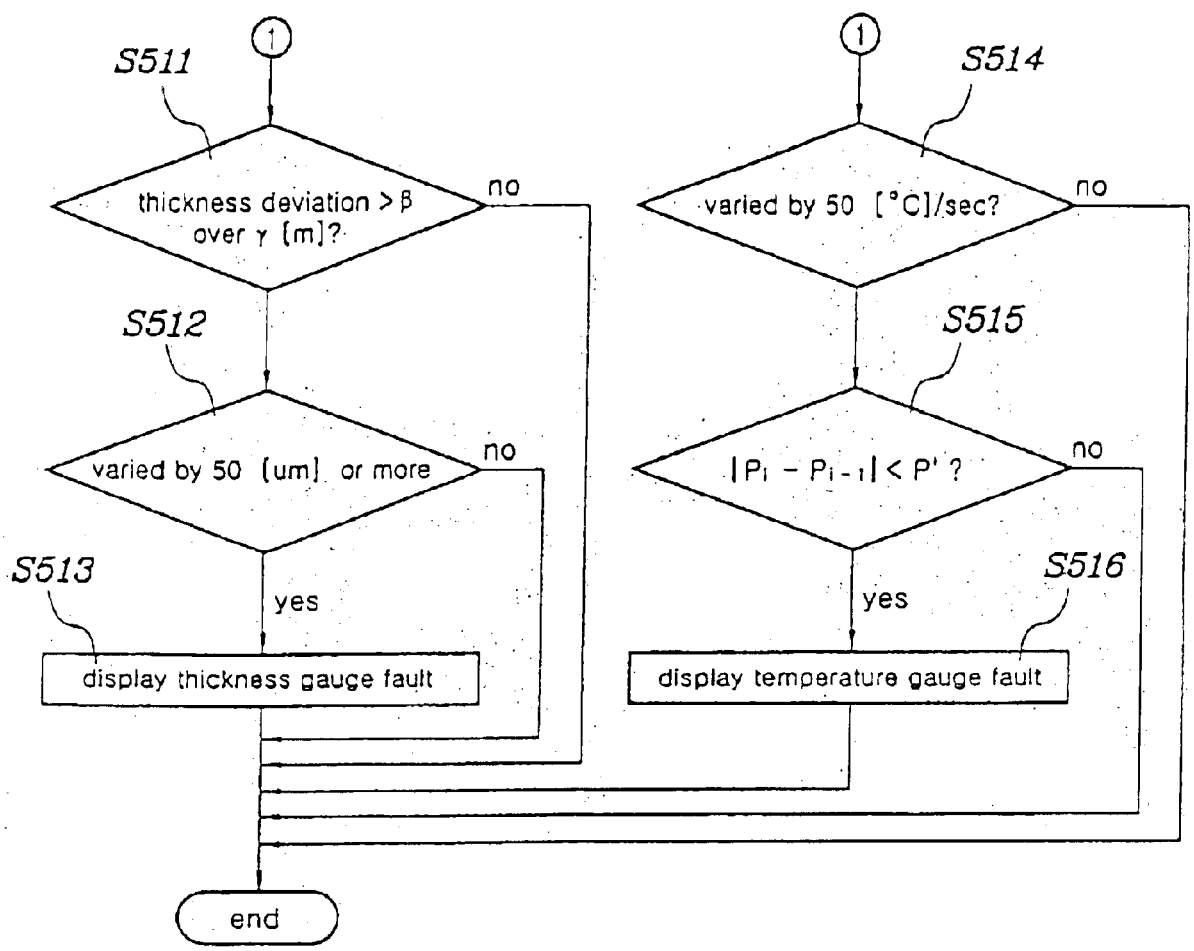

FIGS. 10a and 10b are flowcharts showing a process of diagnosing a facility fault in the method of diagnosing faults in hot strip finishing rolling in accordance with an embodiment of the present invention. FIG. 10a is a flowchart showing a process of diagnosing a roll eccentricity fault, and FIG. 10b is a flowchart showing a process of diagnosing a sensor fault.

Referring to FIG. 10a, the process of diagnosing a roll eccentricity fault is described below.

After values set according to rolling conditions, such as a target thickness, a target load, a roll speed and a roll gap, are read from the SCC setting unit 210 at step S501, it is determined whether a thickness signal of a rolled sheet 203 is applied from the exit side thickness gauge 205 located on the exit side of a stand, that is, whether the exit side thickness gauge 205 is loaded on at step S502. If the rolled sheet 203 is detected, algorithms presented by the present invention are performed.

At step S503, actually measured data are collected from the thickness gauge 205, the entrance side temperature gauge 204, the rolling load measurement sensor 207, and the roll gap measurement sensor 208.

The processes shown in FIGS. 10a and 10b are sub-steps that correspond to step S113 to be performed after steps S101 to S110. These processes are performed after a thickness fault is detected, and are used to determine whether a facility fault has occurred using the data collected at step S503.

Subsequently, at step S504, it is determined whether a thickness deviation collected from the thickness gauge 205 is larger than a consumer control tolerance. This is performed because, if the collected thickness deviation is larger than the consumer control tolerance, it is determined that a thickness fault has occurred.

If, as the result of the determination at step S504, the thickness deviation is equal to or smaller than the consumer control tolerance, the process ends. If the collected thickness deviation is larger than the consumer control tolerance, the upper and lower rotation frequencies are calculated at step S505. In this case, the upper and lower rotation frequencies are calculated using the following Equation 10.

$$f = \frac{w}{2\pi} = \frac{V \text{ [mpm]}}{2\pi R} = \frac{V \text{ [mpm]} \cdot 1000}{2\pi R \text{ [mm]} \cdot 60} \text{ [Hz]} \qquad (10)$$

where V is a backup roll rotation speed and R is a radius of the backup roll, which are values preset in the SCC setting unit 210 before rolling.

Subsequently, step S506, an actually measured exit side thickness is FFT converted. In this case, since the FFT conversion is difficult in a roll speed variable interval, the FFT conversion is performed in a normal rolling interval, that is, an interval where a roll speed is constant.

At step S507, the frequency fa corresponding to each frequency is calculated from the result value of step S506. Each frequency has a corresponding spectrum intensity.

Subsequently, at step S508, a point where a value n times the rotation frequency of the backup roll calculated at step S105 and the frequency fa calculated at step S507 coincide with each other is searched for. In this case, if the frequencies coincide with each other, this means that eccentricity exists in the backup roll of a stand at the frequency. However, even though the frequencies coincide with each other, eccentricity does not always exist, so that the following steps are performed.

Step S509 is the step of determining whether the intensity of a spectrum corresponding to the frequency of step S508 is equal to or higher than a set value α, which is preset in the SCC setting unit 210 before rolling and is set according to the speed of each stand. If the intensity of a spectrum is equal to or higher than the set value, it is determined that eccentricity has occurred in the backup roll of a corresponding stand, which is displayed at step S510.

FIG. 10b is a flowchart showing the process of diagnosing the sensor fault, which is described in detail below.

At step S511, it is determined whether the exit side thickness deviation is larger than β $\mu$m over γm or more. In this case, β and γ are values set in the SCC setting unit 210, which are generally set to 5 m and 100 $\mu$m. If, as the result of the determination at step S511, the above-described condition is fulfilled, it is determined that cooling water on the rolled sheet is a cause to produce the thickness deviation, so that it is determined that a sensor fault other than a thickness fault has occurred.

At step S512, a thickness gauge fault is diagnosed using the following Determination equation 9.

[Determination Equation 9]

$$|h_i - h_{i-1}| > h'$$

where i is the number of samples, and h' is a coefficient set in the SCC setting unit 210, which is generally set to 50 to 100 $\mu$m.

Subsequently, if the condition of step S512 is fulfilled, a thickness gauge fault is displayed at step S513, and the process ends.

Meanwhile, steps S514 to S516 are steps of determining whether a temperature gauge has occurred, which is described in detail below.

At step S514, it is determined whether an exit side temperature variation is equal to or larger than a preset value per second. Generally, since the temperature of the rolled sheet varies in the form of a low frequency, it may be assumed that such sudden variation is caused by the temperature gauge fault. In the present embodiment, the preset value is set to 50° C.

Subsequently, if, as the result of the determination at step S514, the exit side temperature variation is equal to or larger than the preset value, it is determined that the temperature gauge fault has occurred using the following Determination equation 10 at step S515.

[Determination Equation 10]

$$|P_i - P_{i-1}| < P'$$

where i is the number of samples, and P' is a roll force coefficient set in the SCC setting unit 210, which is set to 50 ton in the present embodiment.

If the condition of step S515 is fulfilled, the temperature gauge fault is displayed at step S516 and the process ends.

Figure 11:
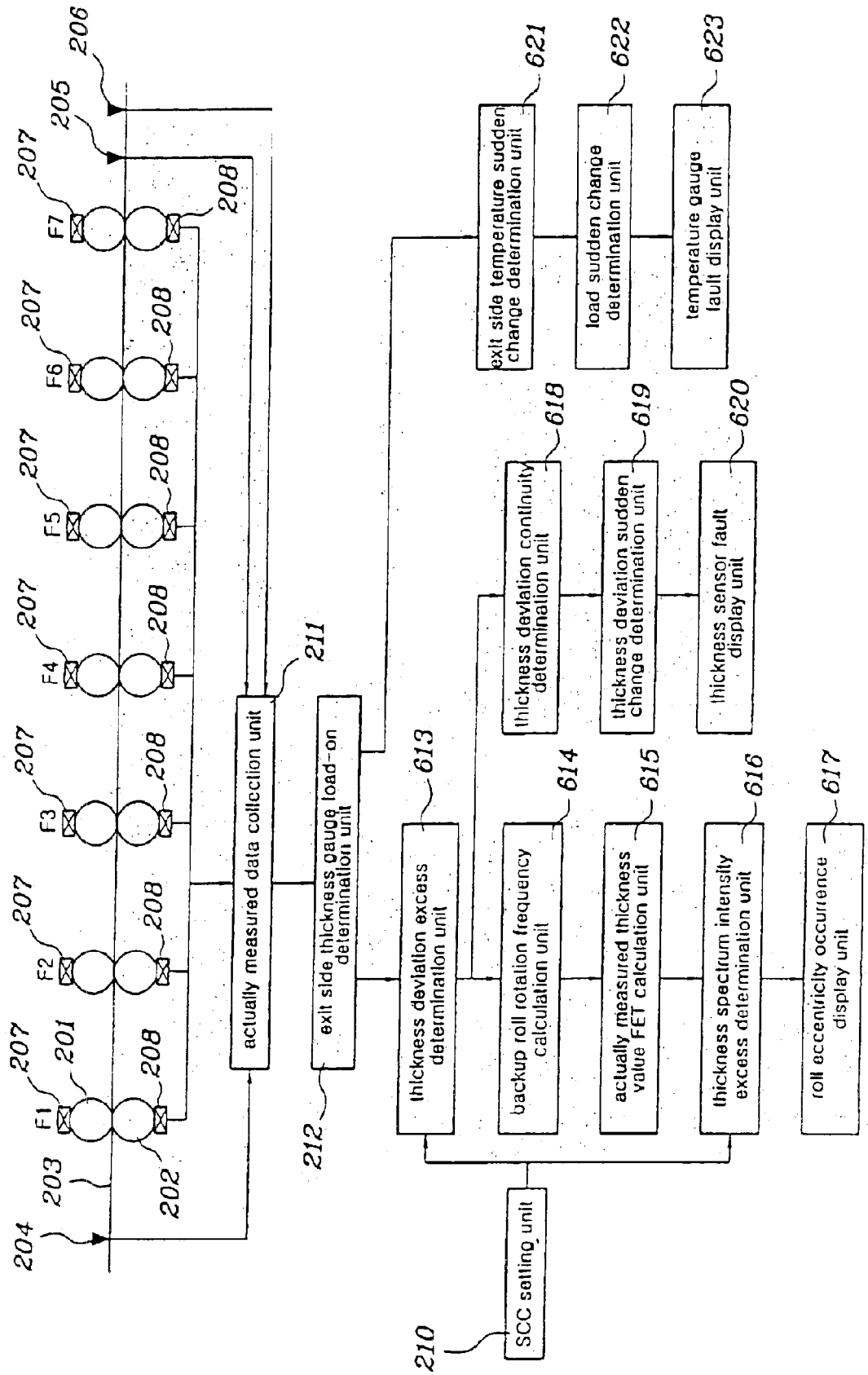
FIG. 11 is a schematic configuration diagram showing the facility fault determination unit 220 of the apparatus for diagnosing faults in hot strip finishing rolling.

FIG. 11 is a schematic configuration diagram showing the facility fault determination unit 220 of the apparatus for diagnosing faults in hot strip finishing rolling, which is described in detail below.

The facility fault determination unit 220 utilizes data from the SCC setting unit 210 for applying preset target values, such as a target thickness, a target load, a roll speed and a roll gap, the actually measured data collection unit 211 for collecting actually measured data from the thickness gauge 205, the entrance side temperature gauge 204, the exit side temperature gauge 206, the rolling load measurement sensor 207 and the roll gap measurement sensor 208, and the exit side thickness gauge loaded-on determination unit 212 for determining whether an exit side thickness gauge is loaded on.

The SCC setting unit 210, the thickness gauge 205, the exit side temperature gauge 206, the rolling load measurement sensor 207 and the roll gap measurement sensor 208 are the same as those of FIG. 2.

The facility fault determination unit 220 may be divided into a roll eccentricity fault diagnosis module and a sensor fault diagnosis module. The sensor fault diagnosis may divided into a thickness gauge fault diagnosis module and a temperature gauge fault diagnosis module, which are described in detail below.

First, the roll eccentricity fault diagnosis is described below.

The roll eccentricity fault diagnosis module is constructed to include a thickness deviation excess determination unit 613 for determining whether a thickness deviation is larger than a consumer control tolerance, a backup roll rotation frequency calculation unit 614 for calculating the upper and lower rotation frequencies of a backup roll if, as the result of the determination in the thickness deviation excess determination unit 613, the thickness deviation is larger than the consumer control tolerance, an actually measured thickness value FET calculation unit 615 for FFT converting an actually measured exit side thickness value, a thickness spectrum intensity excess determination unit 616 for calculating a frequency fa corresponding to each spectrum intensity from the result value of the actually measured value FET calculation unit 615, determining whether there is a point where a value n times the rotation frequency of a backup roll calculated in the backup roll rotation frequency calculation unit 614 and the frequency fa corresponding to each spectrum intensity coincide with each other, and determining whether the spectrum intensity corresponding to the frequency fa is larger than a coefficient set in the SCC setting unit 210, and a roll eccentricity occurrence display unit 617 for displaying the occurrence of roll eccentricity because it can be determined that the roll eccentricity has occurred if, as the result of the determination in the thickness spectrum intensity excess determination unit 616, the spectrum intensity is larger than the set coefficient.

The thickness gauge fault diagnosis module of the sensor fault diagnosis module is described below.

The thickness gauge fault diagnosis module is constructed to include a thickness deviation continuity determination unit 618 for determining whether the exit side thickness deviation is continuously larger than β over γ set in the SCC setting unit 210 if, as the result of the determination in the thickness deviation excess determination unit 613, the thickness deviation is larger than the control tolerance, a thickness deviation sudden change determination unit 619 for determining whether a thickness variation larger than a preset value has occurred in the period of single sampling if the condition of the thickness deviation continuity determination unit 618 is fulfilled, and a thickness sensor fault display unit 620 for displaying a thickness gauge fault if, as the result of the determination in the thickness deviation sudden change determination unit 619, the thickness variation larger than the preset value has occurred.

The temperature gauge fault diagnosis module of the sensor fault diagnosis module is described below.

The temperature gauge fault diagnosis module is constructed to include an exit side temperature sudden change determination unit 621 for determining whether a temperature deviation has varied by a preset value set in the SCC setting unit 210 or more, a load sudden change determination unit 622 for determining whether a temperature gauge fault by evaluating the magnitude of the load variation in the period of a single sampling if, as the result of the determination in the exit side sudden change determination unit 621, an exit side temperature has suddenly varied, and a temperature gauge fault display unit 623 for displaying a temperature gauge fault if, as the result of the determination in the load sudden change determination unit 622, it is determined that the temperature gauge has occurred.

Figure 12A:
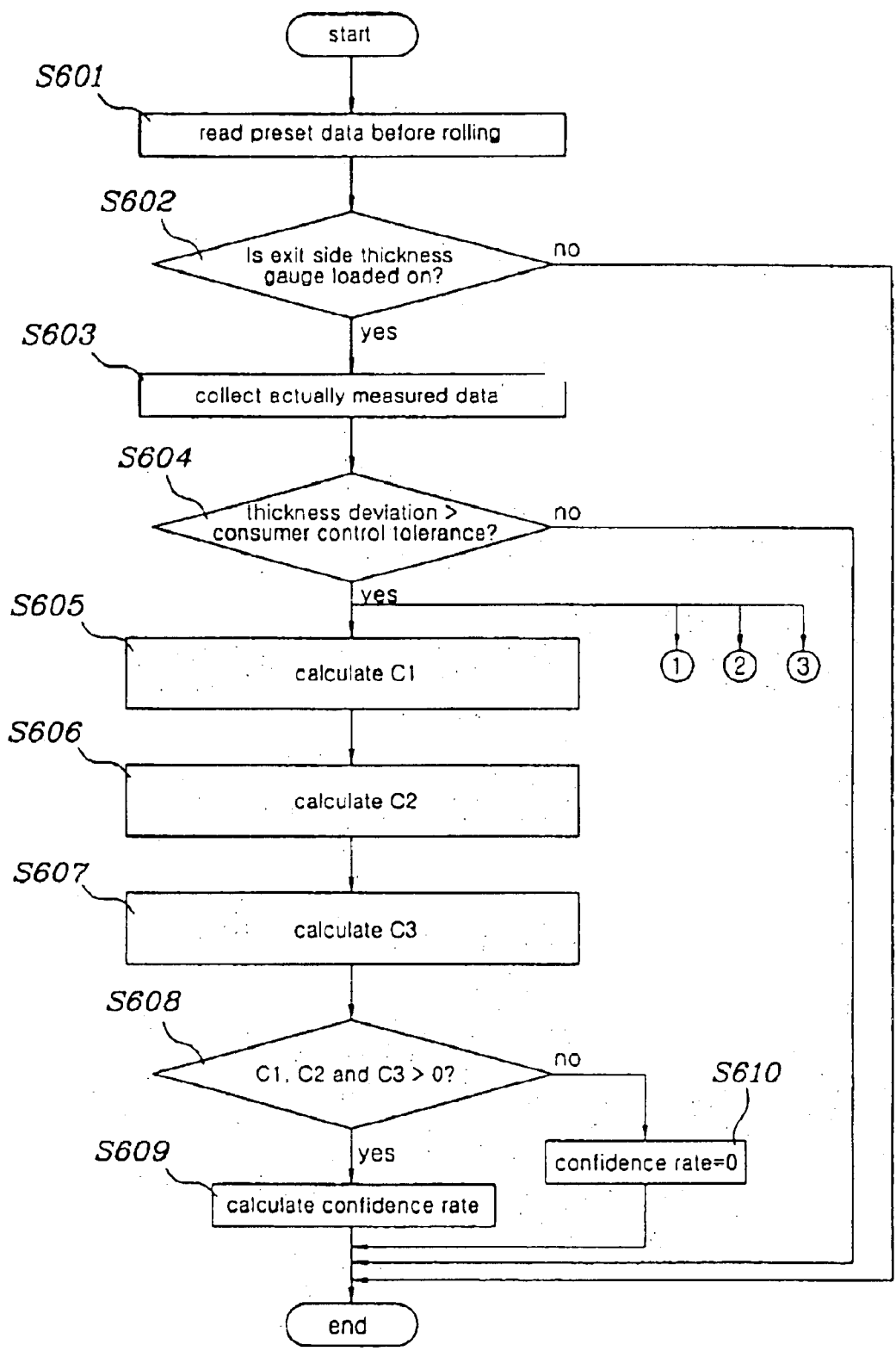
Figure 12B:
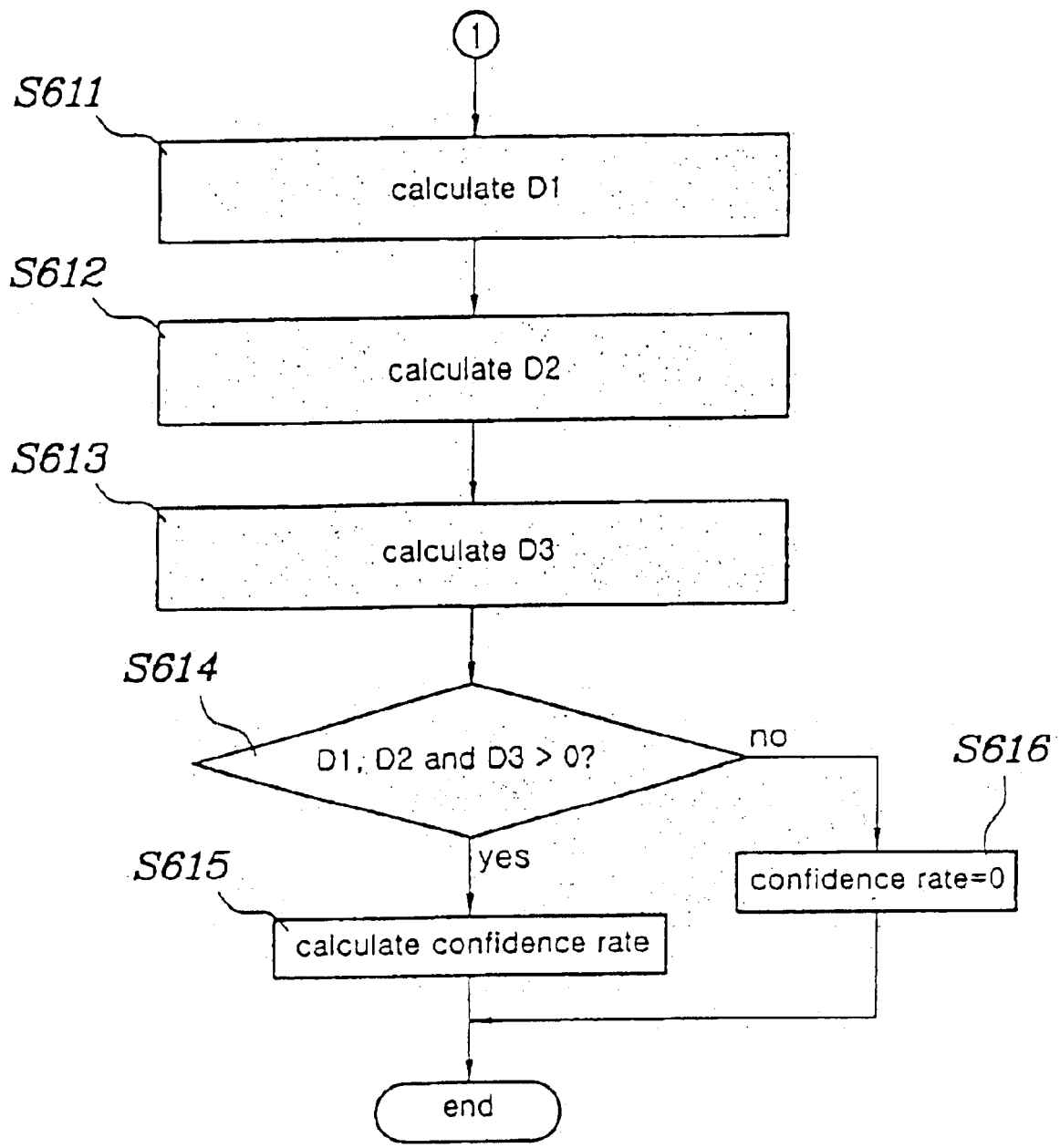
Figure 12C:
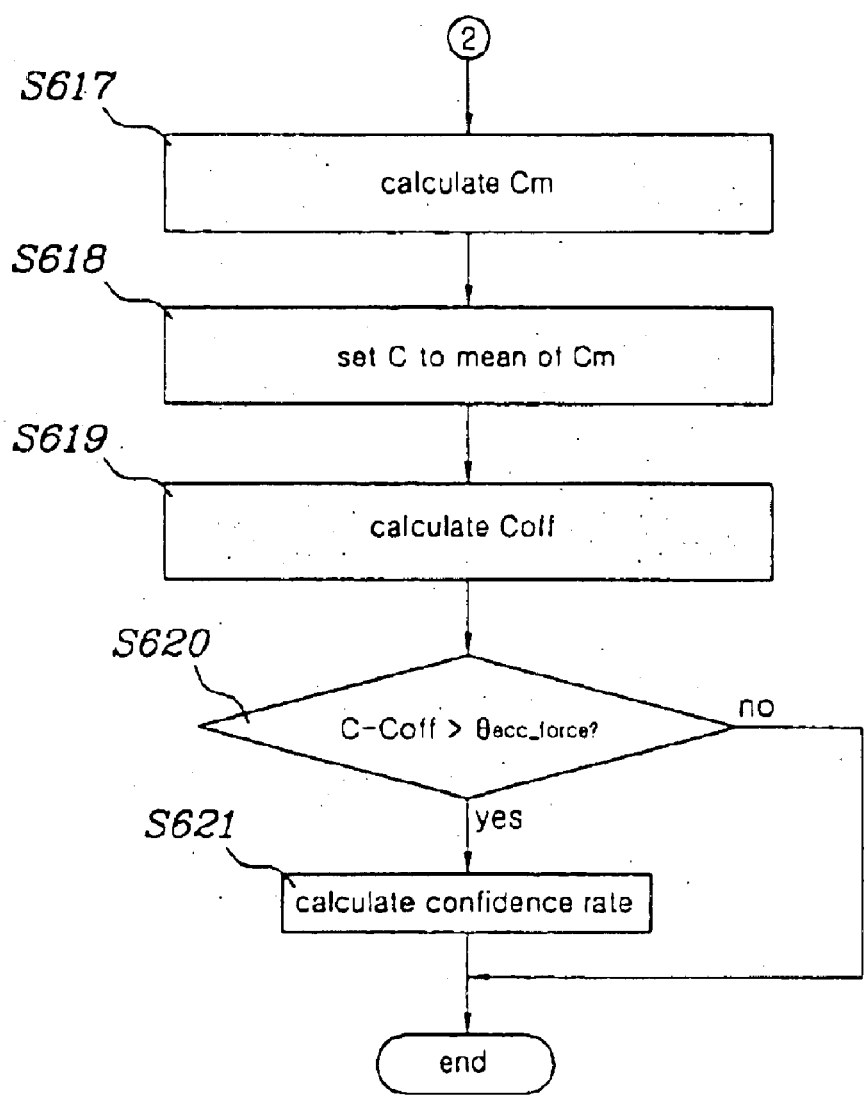
Figure 12D:
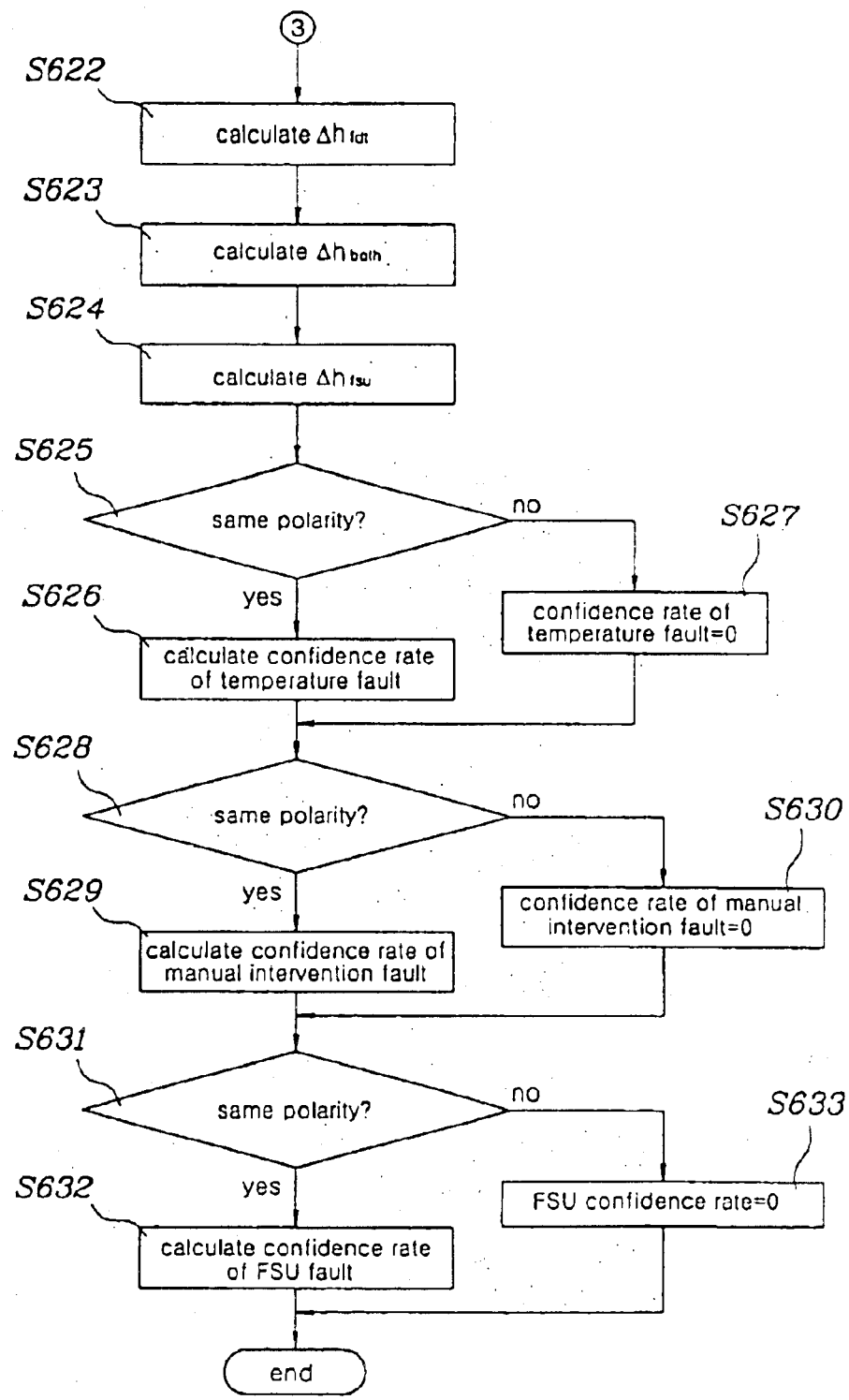

FIGS. 12*a* to 12*d* are flowcharts showing a process of evaluating confidence rates in the method of diagnosing faults in hot strip finishing rolling in accordance with an embodiment of the present invention. FIG. 12*a* is a flowchart showing a process of evaluating the confidence rate of operator roll speed intervention, FIG. 12*b* is a flowchart showing a process of evaluating the confidence rate of operator spraying intervention, FIG. 12*c* is a flowchart showing a process of evaluating the confidence rate of roll eccentricity, and FIG. 12*d* is a flowchart showing a process of evaluating the confidence rate of an FSU fault.

Referring to FIG. 12*a*, the process of evaluating the confidence rate of operator roll speed intervention is described below.

After values set according to rolling conditions, such as a target thickness, a target load, a roll speed and a roll gap, are read from the SCC setting unit 210 at step S601, it is determined whether a thickness signal of a rolled sheet 203 is applied from the exit side thickness gauge 205 located on the exit side of a stand, that is, whether the exit side thickness gauge 205 is loaded on at step S602. If the rolled sheet 203 is detected, algorithms presented by the present invention are performed.

At step S603, actually measured data are collected from the thickness gauge 205, the entrance side temperature gauge 204, the exit side temperature gauge 206, the rolling load measurement sensor 207, and the roll gap measurement sensor 208.

Subsequently, at step S604, it is determined whether a thickness deviation collected from the thickness gauge 205 is larger than a consumer control tolerance. This is performed because, if the collected thickness deviation is larger than the consumer control tolerance, it is determined that a thickness fault has occurred.

If, as the result of the determination at step S604, the thickness deviation is equal to or smaller than the consumer control tolerance, the process ends. If the collected thickness deviation is larger than the consumer control tolerance, the correlation between the amount of operator intervention and a tension variation is calculated at step S605. By calculating the correlation, the confidence rate of the thickness fault can be determined. The calculation of the correlation is performed using the following Equation 11 (method of calculating correlation between two data to calculate confidence rate of thickness fault).

$$C1 = \frac{\langle f, g \rangle}{\|f\| \cdot \|g\|} \quad (11)$$

$$= \frac{\sum_{k=1}^{N} f_k g_k}{\sqrt{\sum_{k=1}^{N} f_k^2} \cdot \sqrt{\sum_{k=1}^{N} g_k^2}}$$

where C1 is the correlation, f and g are data vectors, <f, g> is the inner product of two vectors, and ∥ ∥ is the magnitude of a vector.

Equation 11 is derived as described below.

If it is assumed that an angle formed by vectors f and g is θ, the inner product of the vectors f and g is defined as <f,g>=∥f∥ ∥g∥cos θ=f₁g₁+f₂g₂ in a two-dimension vector space. The inner product has a feature that represents an angle concept between vectors, which is the same in multi-dimension spaces.

If two vectors in an N-dimension space form an angle of θ in the N-dimension space, the inner product of the two vectors takes the form of $$\langle f, g \rangle = f_1 g_1 + f_2 g_2 + \ldots + f_N g_N = \sum_{k=1}^{N} f_k g_k.$$

From the above equation, the correlation coefficient of the N-dimension is derived. In the above equation, $$\cos\theta = \frac{\langle f, g \rangle}{\|f\| \, \|g\|},$$

which is expressed as Equation 11 in terms of a correlation.

In Equation 11, $-1 \leq \cos\theta \leq 1$, so that $-1 \leq C1 \leq 1$.

That is, the magnitude of C1 represents the intensity of the angular relationship between f and g. When the directions of the two data coincide with each other, that is, θ=0, the value of C1 is a maximum value, that is, 1. As the angle increases, the value of C1 becomes smaller. Meanwhile, when C1=0, that is, <f, g>=0, f and g intersect at right angles.

In accordance with Equation 11, C1 is a value depending on the angle of the two vectors, and has no connection with the magnitudes of the two vectors.

Step S606 is the step of calculating the correlation C2 between a measured thickness deviation and a tension variation, which is performed using Equation 11.

Step S607 is the step of calculating the correlation C3 between the amount of speed intervention of the operator and the thickness correlation, which is performed using Equation 11.

In brief, to calculate the confidence rate of roll speed intervention of the operator, the correlations between the amount of roll speed of the operator, the tension variation and the thickness deviation are calculated.

Step S608 is the step of evaluating the polarities of the calculated correlations. As described in conjunction with Equation 11, the correlation has a value between −1 and +1 and (−) correlation means that there is no correlation. Accordingly, if at least one of the three correlations is (−), the correlation is expressed as 0 at step S610.

Step S609 is the step of obtaining the final confidence rate of the roll speed if the three correlations are all (−). The final confidence rate of roll speed takes the form of an arithmetic mean as shown in the following Equation 12.

$$\text{confidence rate} = \frac{\sum_{k=1}^{N} C_k}{N} \quad (12)$$

Referring to FIG. 12b, the confidence rate of spraying intervention of the operator is described below.

Step S611 is the step of calculating the correlation D1 between the thickness deviation and the actually measured temperature in the same manner as in Equation 11.

Step S612 is the step of calculating the correlation D2 between the thickness deviation, calculated using a gauge meter equation in a stand where the spraying intervention of the operator has occurred, and the actually measured temperature in the same manner as in Equation 11.

Step S613 is the step of calculating the correlation D3 between the actually measured deviation and the thickness deviation calculated using a gauge meter equation in the manner as in Equation 11.

Step S614 is the step of evaluating the polarities of the calculated correlations. Since (−) correlation means that there is no correlation as described above, the correlation is determined to be 0 if at least one of the three correlations is (−) at step S616.

Step S615 is the step of calculating the final confidence rate of the spraying intervention of the operator if all the signs of the three correlations are (+). The final confidence rate of the spraying intervention of the operator is the arithmetic mean of the three correlations, which is performed in the same manner as in Equation 12.

Referring to FIG. 12c, the process of calculating the confidence rate of roll eccentricity is described below.

$$C_m^i = \frac{C_{top}^i + C_{bottom}^i}{2} \quad (13)$$

where m is a value between 1 and 3, $C_m^i$ is the mean spectrum intensity of an i-th stand, $C_{top}^i$ is the spectrum intensity of the upper backup roll of the i-th stand, and $C_{house}^i$ is the spectrum intensity of the lower backup roll of the i-th stand.

Step S618 is the step of calculating the mean of $C_m^i$ obtained at step S617 and setting C to the calculated mean.

Step S619 is the step of obtaining spectrum intensities at frequencies other than the main frequencies of upper and lower backup rolls. The mean spectrum intensity is $C_{off}$.

Step S620 is the step of comparing the calculated spectrum intensities, in which it is determined whether the deviation between the mean intensity at main frequencies obtained at S618 and the mean intensity at the frequency obtained at step S619 is larger than a preset value $\theta_{ecc\_}^{force}$ set in the SCC setting unit. If the spectrum intensity at the main frequency is larger, this means that roll eccentricity is larger, so that the confidence rate of the roll eccentricity is calculated using the following Equation 14.

$$\text{confidence rate} = \frac{C - C_{off}}{C} * 100 * C_{ecc\_force} \quad (14)$$

where $C_{ecc_{hd}}^{force}$ is a preset value set in the SCC setting unit 210, which is determined through tests.

Referring to FIG. 12d, the process of calculating the confidence rate of the FSU fault is described below.

The actually measured load deviations of respective stands are caused by an exit side material thickness variation, the occurrence of a temperature deviation, both intervention (in the case where manual roll gap intervention is involved in both work side and drive side) and a FSU setting error. Accordingly, the actually measured load deviations are divided into load deviations for the respective causes, the degrees of contribution to X-ray thickness deviations for the respective causes are expected, and the confidence rates for the respective causes are set to the ratios of the amounts of thickness variation for the respective causes to the total amount of thickness variation, respectively. The following equations are used for the above-described process.

[i-th stand roll force equilibrium equation]

$$\Delta F_{total}^i = \Delta F_H^i + \Delta F_{fdt}^i + \Delta F_{both}^i + \Delta F_{fsu}^i$$

where $\Delta F_{total}^i (= F_{oct}^i - F_{set}^i)$ represents the amount of total roll force variation (actually measured load-preset load), $\Delta F_H^i$ represents the amount of roll force attributable to an entrance side sheet thickness deviation, $\Delta F_{fdt}^i$ represents the amount of roll force variation attributable to a temperature deviation, $\Delta F_{both}^i$ represents the amount of roll force variation attributable to both manual intervention, and $\Delta_{fsu}^i$ represents the amount of roll force variation attributable to an FSU setting error.

[Amount of roll force variation in i-th stand attributable to entrance side sheet thickness deviation in i-th stand]

$$\Delta F_H^i = \frac{1}{1000} \cdot \frac{M^i \cdot Q^i}{M^i + Q^i} \cdot \Delta H^i$$

where $\Delta H^i$ represents an entrance side sheet thickness deviation in an i-th stand [μm] (plus=large), $M^i$ represents a mill constant in a i-th stand [ton/mm], and $Q^i$ represents a plastic coefficient in an i-th stand {ton/mm}.

[Amount of roll force variation in i-th stand attributable to temperature deviation]

$$\Delta F_{fdt}^i = \Delta T^{FDT} \cdot \frac{T^i}{T^{FDT}} \cdot \left(\frac{\partial F^i}{\partial T^i}\right)$$

where $\Delta T^{FDT} (= T_{oct}^{FDT} - T_{set}^{FDT})$ represents an FDT deviation (actually measured temperature-preset temperature), and $$\left(\frac{\partial F^i}{\partial T^i}\right)(<0)$$

represents the degree of influence (influence coefficient) that a temperature deviation in an i-th stand applies to roll force in the i-th stand.

[Amount of roll force variation in i-th stand attributable to both intervention in i-th stand]

$$\Delta F_{both}^i \cong -\frac{1}{1000} \cdot \frac{M^i \cdot Q^i}{M^i + Q^i} \cdot (-10 \cdot \Delta S_{both}^i)$$

where $\Delta S_{both}^i$ represents the amount of both intervention in an i-th stand [10 μm] (plus=close).

[Amount of roll force variation in i-th stand attributable to FSU setting error]

$$\Delta F_{fsu}^i = \Delta F_{total}^i - \Delta F_{bot\Delta}^o - \Delta F_{fdt}^i - \Delta F_H^i$$

[Amount of exit side sheet thickness variation in i-th stand attributable to entrance side thickness deviation in i-th stand]

$$\Delta h_H^i = \frac{Q^i}{M^i + Q^i} \cdot \Delta H^i$$

[Amount of exit side sheet thickness variation in i-th stand attributable to temperature deviation]

$$\Delta h_{fds}^i = \frac{1000}{M^i} \cdot \Delta T^{FDT} \cdot \frac{T^i}{T^{FDT}} \cdot \left(\frac{\partial F^i}{\partial T^i}\right)$$

[Amount of exit side sheet thickness variation in i-th stand attributable to both intervention in i-th stand]

$$\Delta h_{both}^i = \frac{M^i}{M^i + Q^i} \cdot (-10 \cdot \Delta S_{both}^i)$$

where $\Delta h^i$ is an exit side sheet thickness in an i-th stand [μm] (plus=large).

[Amount of exit side sheet thickness variation in I-th stand attributable FSU setting error in I-th stand]

$$\Delta h_{fsu}^i \cong \frac{1000}{M^i} \cdot \Delta F_{fsu}^i$$

Step S622 is the step of calculating the amount of thickness variation attributable to a thickness fault, which is performed using the following Equation 15 (amount of X-ray sheet thickness variation attributable to both intervention in i-th stand).

$$\Delta h_{fds}^X \cong \sum_{i=1}^{p} \frac{1000}{M^i} \cdot \Delta T^{FDT} \cdot \frac{T^i}{T^{FDT}} \cdot \left(\frac{\partial F^i}{\partial T^i}\right) \quad (15)$$

where p is the number of all installed stands.

Step S623 is the step of calculating the amount of thickness variation attributable to both intervention, which is performed using the following Equation 16 (amount of X-ray sheet thickness variation attributable to both intervention in i-th stand).

(1) when $i = i \sim p - 1$, $\quad (16)$ $$\Delta h_{both}^X = \left[\prod_{j=i+1}^{p}\left(\frac{Q^j}{M^j + Q^j}\right)\right] \cdot \left(\frac{M^i}{M^i + Q^i}\right) \cdot (-10 \cdot \Delta S_{both}^i)$$

(2) when $i = p$, $\Delta h_{both}^i = \frac{M^i}{M^i + Q^i} \cdot (-10 \cdot \Delta S_{both}^i)$ Step S624 is the step of calculating the amount of thickness variation attributable to an FSU fault, which is performed using the following Equation 17 (amount of X-ray sheet thickness variation attributable to FSU setting error in i-th stand).

(1) when $i = 1 \sim p - 1$, $\Delta h_{fsu}^{X} =$ (17)

$$\left\{\prod_{j=i+1}^{p}\left(\frac{Q^j}{M^j + Q^j}\right)\right\} \cdot \Delta h_{fsu}^i = \left\{\prod_{j=i+1}^{p}\left(\frac{Q^j}{M^j + Q^j}\right)\right\} \cdot \frac{1000}{M^i} \cdot \Delta F_{fsu}^i$$

(2) when $i = p$, $\Delta h_{fsu}^{X} = \frac{1000}{M^i} \cdot \Delta F_{fsu}^i$ Step S625 is the step of evaluating polarities, in which the polarity of the amount of thickness variation attributable to a temperature calculated by Equation 15 is compared with the polarity of an X-ray thickness deviation. If, as the result of the comparison, the polarities are different from each other, the confidence rate is determined to be 0. If the polarities are identical with each other, the confidence rate is calculated using the following Equation 18 at step S626 (confidence rate calculation).

$$\Delta h_{\text{xray\_top}} = \Delta h_{fdt}^{X} + \Delta h_{both}^{X} + \Delta h_{fsu}^{X} \qquad (18)$$

$$C_{fdt} = \frac{\Delta h_{fdt}^{X}}{\Delta h_{\text{xray\_top}}} \cdot 100[\%]$$

$$C_{both} = \frac{\Delta h_{both}^{X}}{\Delta h_{\text{xray\_top}}} \cdot 100[\%]$$

$$C_{fsu} = \frac{\Delta h_{fsu}^{X}}{\Delta h_{\text{xray\_top}}} \cdot 100[\%]$$

where $C_{fdt}$ is the confidence rate of a temperature fault, $C_{both}$ is confidence rate of both intervention, $C_{fsu}$ is the confidence rate of an FSU setting error, $\Delta h_{fdt}^{X}$ is the amount of X-ray sheet thickness variation attributable to a temperature fault, $\Delta h_{both}^{X}$ is the amount of X-ray sheet thickness variation attributable to both intervention, and $\Delta h_{fsu}^{X}$ is the amount of X-ray sheet thickness variation attributable to an FSU setting error.

Subsequently, at step S628, the polarities of the amount of thickness variation attributable to manual both intervention and an X-ray thickness deviation are compared with each other. If, as the result of this comparison, the polarities are different from each other, the confidence rate is determined to be 0 at step S633. If the polarities are identical with each other, the confidence rate is calculated sing Equation 18 at step S629.

At step S631, the polarities of the amount of thickness variation attributable to FSU calculated using Equation 17 and the X-ray thickness deviation are compared with each other. If, as the result of this comparison, the polarities are different from each other, the confidence rate is determined to be 0 at step S633. If the polarities are identical with each other, the confidence rate is calculated using Equation 18 at step S632.

Figure 13:
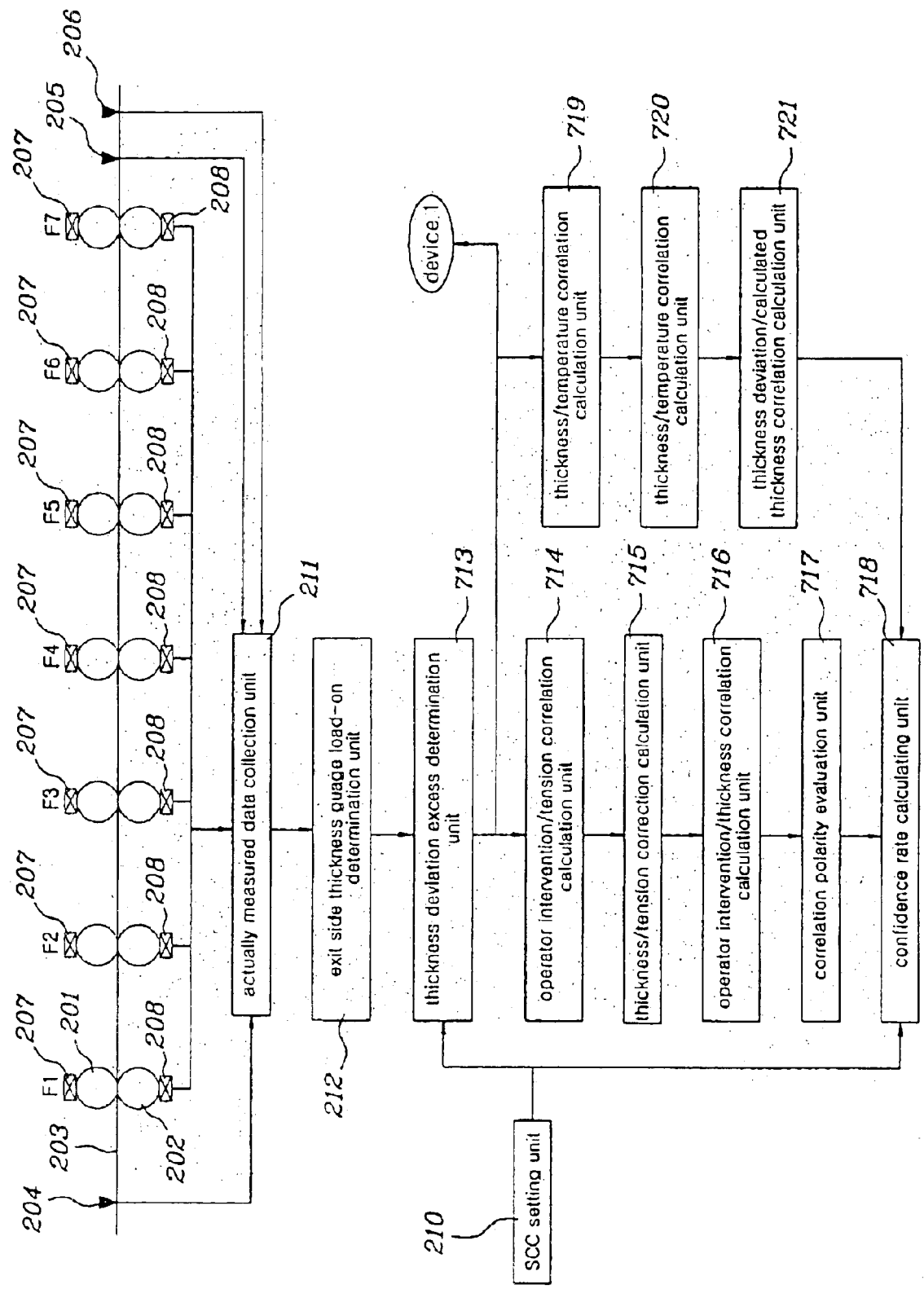
FIGS. 13 and 14 are schematic configuration diagrams showing a confidence rate evaluation unit of the apparatus for diagnosing faults in hot strip finishing rolling.
Figure 14:
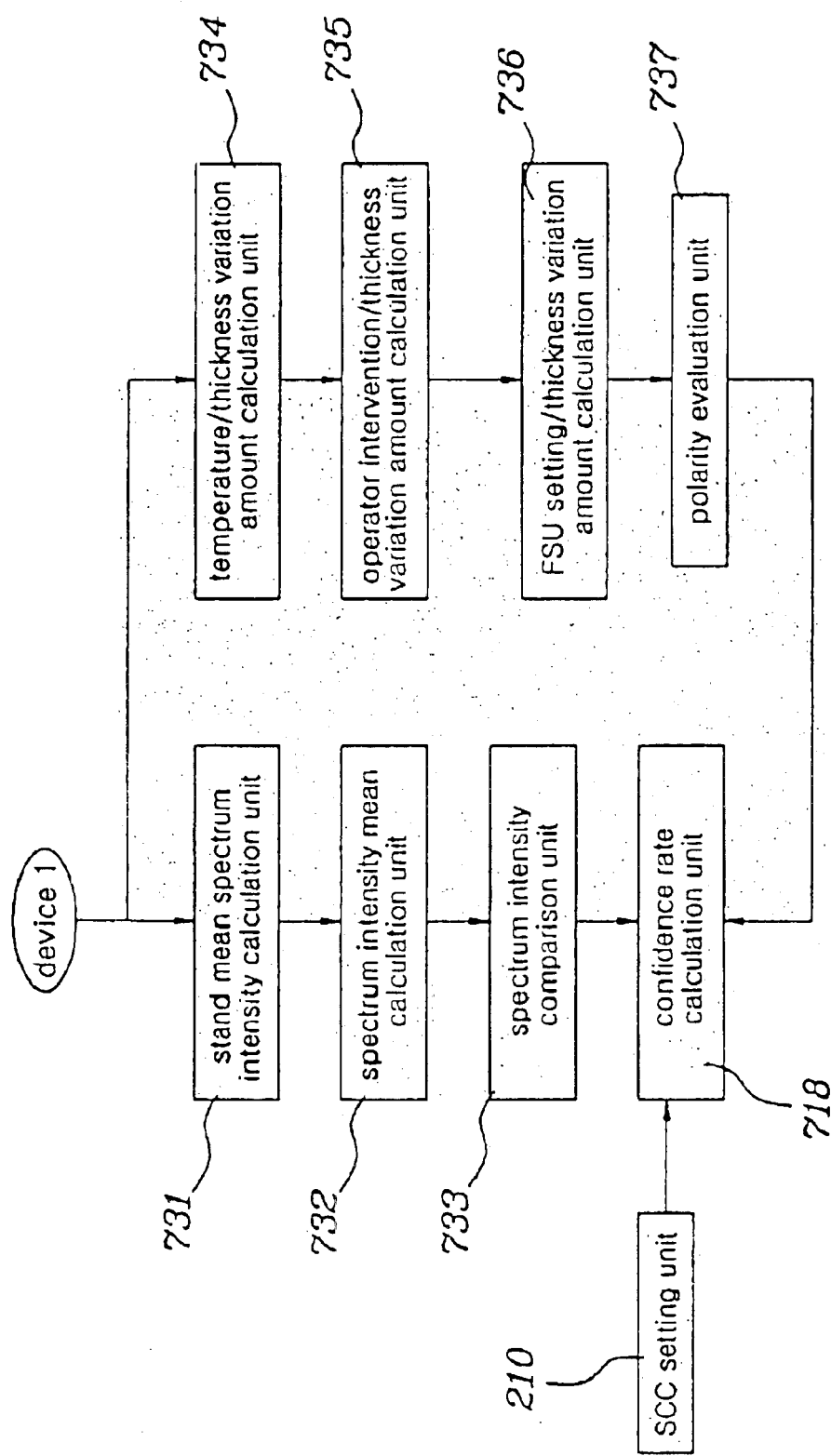

FIGS. 13 and 14 are schematic configuration diagrams showing the confidence rate evaluation unit 222 of the apparatus for diagnosing faults in hot strip finishing rolling, which is described in detail below.

The confidence rate evaluation unit 222 applied to the present invention performs evaluation using data from the SCC setting unit 210 for applying preset target values, such as a target thickness, a target load, a roll speed and a roll gap, the actually measured data collection unit 211 for collecting actually measured data from the thickness gauge 205, the entrance side temperature gauge 204, the exit side temperature gauge 206, the rolling load measurement sensor 207 and the roll gap measurement sensor 208, and the exit side thickness gauge loaded-on determination unit 212 for determining whether an exit side thickness gauge is loaded on.

The SCC setting unit 210, the thickness gauge 205, the exit side temperature gauge 206, the rolling load measurement sensor 207 and the roll gap measurement sensor 208 are the same as those of FIG. 2.

The confidence rate determination unit 222 may be divided into an operator roll speed intervention confidence rate determination module, an operator spraying intervention confidence rate determination module, a roll eccentricity confidence rate determination module and an FSU fault confidence rate determination module, which are described below.

The operator roll speed intervention confidence rate determination module is constructed to include a thickness deviation excess determination unit 713 for determining whether the thickness deviation is larger than the consumer control tolerance, an operator intervention/tension correlation calculation unit 714 for calculating the correlation C1 between the amount of operator intervention and the tension variation if the thickness deviation is larger than the consumer control tolerance, a thickness/tension correlation calculation unit 715 for calculating the correlation C2 between the thickness deviation and the tension variation, an operator intervention/thickness correlation calculation unit 716 for calculating the correlation C3 between the amount of operator intervention and the thickness deviation, a correlation polarity evaluation unit 717 for evaluating the polarities of the correlations C1, C2 and C3, and a confidence rate calculating unit 718 for determining the confidence rate to be 0 if at least one of the three correlations has a (−) sign, and determining the final confidence rate of the operator roll speed intervention to be the mean of the three correlations if all the three correlations have an (+) sign.

The operator spraying intervention confidence rate determination module is constructed to include a thickness/temperature correlation calculation unit 719 for calculating the correlation D1 between the thickness deviation and the actually measured temperature if the thickness deviation is larger than the consumer control tolerance, a thickness/temperature correlation calculation unit 720 for calculating the correlation D2 between the thickness deviation, calculated using the gauge meter equation in the stand where the operator spraying intervention has occurred, and the actually measured temperature, a thickness deviation/calculated thickness correlation calculation unit 721 for calculating the correlation D3 between the actually measured thickness deviation and the thickness deviation calculated using the gauge meter equation, and a confidence rate calculation unit 718 for determining the confidence rate to be 0 if at least one of the three correlations has a (−) sign, and determining the final confidence rate of the operator spraying intervention to be the mean of the three correlations if all the three correlations have a (+) sign.

The roll eccentricity confidence rate determination module is constructed to include a stand mean spectrum intensity calculation unit 731 for calculating the mean spectrum intensity of each stand if the thickness deviation is larger than the consumer control tolerance, a spectrum intensity mean calculation unit 732 for calculating the mean of spectrum intensities at frequencies other than the main frequencies of the upper and lower backup rolls, a spectrum intensity comparison unit 733 for calculating the deviation between the spectrum intensity at the main frequencies and the spectrum intensity at the frequencies other than the main frequencies, and a confidence rate calculation unit 718 for calculating the confidence rate using the deviation between the spectrum intensity at the main frequencies and the spectrum intensity at the frequencies other than the main frequencies because roll eccentricity is large if the spectrum intensity at the main frequencies is larger.

The FSU fault confidence rate determination module is constructed to include a temperature/thickness variation amount calculation unit 734 for calculating the amount of thickness variation caused by the temperature fault, an operator intervention/thickness variation amount calculation unit 735 for calculating the amount of thickness variation caused by both intervention, an FSU setting/thickness variation amount calculation unit 736 for calculating the amount of thickness variation caused by the FSU fault, a polarity evaluation unit 737 for evaluating the polarities of the three amounts of variation and the X-ray thickness deviation, and a confidence rate calculation unit 718 for determining the final confidence rate to be 0 if, as the result of determination in the polarity evaluation unit 737, the polarities are different from each other, and determining each of the confidence rates to be in proportion to the X-ray thickness deviation.

As described above, the present invention provides an apparatus and method for diagnosing faults in hot strip finishing rolling, which is capable of quickly diagnosing the causes of quality and control faults that the operator cannot instantaneously judge, so as to manufacture rolled products of high quality using a quality control system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for diagnosing faults in hot strip finishing rolling, comprising:
    a Supervisory Control Computer (SCC) setting unit for applying preset target values;
    an actually measured data collection unit for collecting actually measured data;
    an exit side thickness gauge loaded-on determination unit for determining whether an exit side thickness gauge is loaded on, and starting diagnoses of the faults in the hot strip finishing rolling if the exit side thickness gauge is loaded on;
    a part identification unit for identifying a front end part, body part and tail end part of a rolled sheet using thickness data;
    an on-gauge ratio calculation unit for calculating on-gauge ratios on the front end part, the body part and the tail end part using the actually measured data collected by the actually measured data collection unit and the preset target values set in the SCC setting unit;
    a primary fault determination unit for determining whether faults have occurred in the front end part, the body part and the tail end part using values output from the actually measured data collection unit and the on-gauge ratio calculation unit;
    a secondary fault determination unit for determining whether an operator intervention fault, a material fault, a facility fault and a control fault have occurred using values output from the actually measured data collection unit and the preset target values set in the SCC setting unit; and
    a confidence rate evaluation unit for evaluating confidence rates of determination results of the secondary fault determination unit using the preset target values set in the SCC setting unit and the actually measured values.

2. The apparatus as set forth in claim 1, wherein the secondary fault determination unit comprises:
    an operator intervention determination unit for determining whether an operator has intervened in a roll gap, a roll speed and spraying at a point when a thickness fault occurred;
    a material fault determination unit for determining whether a material fault has occurred using an entrance side and exit side temperature deviation and an actually measured thickness;
    a facility fault determination unit for determining whether roll eccentricity or a sensor fault has occurred; and
    a control fault determination unit for determining whether a control fault of a finishing mill has occurred.

3. The apparatus as set forth in claim 2, wherein the operator manipulation evaluation unit comprises:
    a roll gap intervention determination unit for determining whether an amount of roll gap intervention is larger than the corresponding preset value set in the SCC setting unit if a sheet thickness deviation is larger than a consumer control tolerance, and determining whether an operator roll gap intervention fault has occurred by calculating an amount of thickness variation and comparing the amount of roll gap intervention with the amount of thickness variation if the amount of roll gap intervention is larger than the corresponding preset value;
    a roll speed intervention determination unit for determining whether a roll speed intervention fault has occurred by calculating an inter-stand tension and comparing the calculated inter-stand tension with the preset tension value set in the SCC setting unit; and
    a spraying intervention determination unit for calculating a sheet thickness using a stand load, comparing the calculated sheet thickness with the actually measured thickness, and determining that a spraying intervention fault has occurred if a deviation between the calculated sheet thickness with the actually measured thickness is smaller than the preset critical value and a pattern of the thickness variation coincides with a pattern of an exit side temperature variation.

4. The apparatus as set forth in claim 2, wherein the material fault determination unit comprises:
    an actually measured thickness FFT (Fast Fourier Transform) conversion unit for obtaining a sample rolling length using a maximal speed of each stand if a thickness deviation between the corresponding target value set in the SCC setting unit and the actually measured thickness value is larger than a consumer control tolerance, converting a thickness into constant length pitches based on the sample rolling length, and calculating a frequency of a period of a skid mark using the thickness data; and
    a skid mark frequency intensity determination unit for determining whether a skid mark has occurred by calculating a frequency corresponding to each spectrum intensity using the converted value obtained from the actually measured thickness FFT conversion unit, searching for a frequency coinciding with a frequency of the skid mark and evaluating a spectrum intensity of the coinciding frequency.

5. The apparatus as set forth in claim 4, wherein the material fault determination unit comprises:

a sheet thickness sudden change determination unit for determining whether there is an interval where a sheet thickness is suddenly changed;

a carbon amount and target temperature determination unit for determining whether there is a possibility that a transformation fault occurs using the preset target temperature value set in the SCC setting unit and an amount of carbon if there is the interval where the sheet thickness is suddenly changed;

an actually measured temperature determination unit for determining whether an actually measured temperature satisfies a condition for occurrence of transformation if there is the possibility that the transformation fault occurs; and a load/thickness correlation determination unit for determining whether there is a correlation between an actually measured load and a thickness by determining whether each stand coincides with a position of the sudden change of a sheet thickness if the actually measured temperature satisfies the condition for occurrence of transformation.

6. The apparatus as set forth in claim 2, wherein the control fault determination unit comprises:

a thickness deviation excess determination unit for determining whether a thickness deviation between the corresponding target value set in the SCC setting unit and the actually measured thickness is larger than a consumer control tolerance;

an operator intervention determination unit for determining that the roll gap intervention fault has occurred if the thickness deviation is larger than the consumer control tolerance and a deviation between an amount of roll gap intervention of the operator in an i-th sample and an amount of roll gap intervention of the operator in an i+1-th sample is larger than a corresponding preset value set in the SCC setting unit;

an APC determination unit for determining that an APC fault has occurred if the thickness deviation is larger than the consumer control tolerance and a deviation between a preset roll gap value in the i-th sample and an actually measured roll gap value in the i-th sample converges into 0;

a rolling load deviation determination unit for determining whether a Finish Setup (FSU) deformation resistance expectation fault has occurred by determining whether there is a correlation between a load of the front end part and the sheet thickness if the thickness deviation is larger than the consumer control tolerance and a rolling load deviation is larger than a corresponding preset value; and a temperature deviation determination unit for determining whether a FSU temperature expectation fault has occurred by determining whether there is a correlation between the exit side temperature and the actually measured sheet thickness if the thickness deviation is larger than the consumer control tolerance and an actually measured exit side temperature is larger than a corresponding preset value.

7. The apparatus as set forth in claim 6, wherein the control fault determination unit further comprises:

a thickness/width polarity determination unit for determining whether a width variation and a thickness variation have a sane polarity at a point when a Down Coiler (DC) is turned on, and determining that necking has occurred if the two variations have the same polarity;

a temperature/thickness polarity determination unit for determining whether there is a correlation between a temperature variation and a thickness variation, and determining that a material and temperature fault has occurred if there is the correlation;

a thickness/gap occurrence point determination unit for determining whether an operator roll gap intervention fault has occurred by determining whether the roll gap intervention of the operator has occurred in a stand where the thickness variation occurred; and a necking display unit for determining that necking has occurred without a width variation if the roll gap intervention has not occurred at the point when the thickness variation occurred.

8. The apparatus as set forth in claim 2, wherein the control fault determination unit comprises:

a minimal sheet thickness value calculation unit for calculating a minimal actually measured thickness value in a predetermined interval starting at a time when the thickness gauge is turned on by obtaining actually measured thickness values in the interval and determining whether the thickness deviation is larger than the corresponding preset value set in the SCC setting unit;

a fault determination thickness detection unit for detecting actually measured thickness values in a predetermined interval starting from a point where the minimal actually measured value is detected;

a maximal sheet thickness calculation unit for calculating a maximal actually measured thickness value in the interval; and a front end part V-shaped fault determination unit for determining whether a front end part V-shaped sheet fault has occurred by determining whether a deviation between the minimal actually measured thickness value and the maximal actually measured thickness value is larger than a preset value.

9. The apparatus as set forth in claim 8, wherein the control fault determination unit comprises:

an actually measured thickness/temperature correlation determination unit for determining whether there is a correlation between the actually measured thickness value and the actually measured exit side temperature if it is determined that the front end part V-shaped sheet thickness fault has occurred, and determining that a fault in cooling of a front end stand if there is the correlation;

a thickness/operator intervention correlation determination unit for determining whether the V-shaped sheet thickness fault and the roll gap intervention of the operator have the same polarity, and determining that a sheet thickness has been secured by the roll gap intervention of the operator;

a speed setting determination unit for determining that the thickness fault has occurred by the roll gap intervention of the operator if a deviation between the set roll speed value and the actually measured roll speed value converges into 0; and an operator intervention determination unit for determining that an FSU speed setting fault has occurred if the deviation between the set roll speed value and the actually measured roll speed value does not converge into 0 and is larger than a corresponding preset value set in the SCC setting unit, and determining whether the roll speed intervention of the operator has occurred by determining whether the actually measured thickness value and the tension have the same polarity.

10. The apparatus as set forth in claim 8, wherein the control fault determination unit further comprises:
   a thickness/width polarity determination unit for determining whether a width variation and a thickness variation have a same polarity at a point when a Down Coiler (DC) is turned on, and determining that necking has occurred if the two variations have the same polarity;
   a temperature/thickness polarity determination unit for determining whether there is a correlation between a temperature variation and a thickness variation, and determining that a material and temperature fault has occurred if there is the correlation;
   a thickness/gap occurrence point determination unit for determining whether an operator roll gap intervention fault has occurred by determining whether the roll gap intervention of the operator has occurred in a stand where the thickness variation occurred; and
   a necking display unit for determining that necking has occurred without a width variation if the roll gap intervention has not occurred at the point when the thickness variation occurred.

11. The apparatus as set forth in claim 2, wherein the control fault determination unit comprises:
   a temperature/thickness correlation calculation unit for calculating a correlation between a finishing rolling exit side temperature and an actually measured thickness value;
   a temperature/thickness correlation evaluation unit for evaluating a magnitude of the correlation between the finishing rolling exit side temperature and the actually measured thickness value;
   a rolling load frequency conversion unit for frequency converting the actually measured rolling load of the body part if the magnitude of the correlation between the finishing rolling exit side temperature and the actually measured thickness value is lower than a corresponding preset value set in the SCC setting unit;
   a frequency determination unit for determining whether frequency components of monitor Automatic Gauge Control (AGC) and roll force AGC are detected after removing frequency components regarding a skid mark and roll eccentricity that are generally and frequently involved in a frequency analysis of the actually measured finishing rolling thickness value from a value output from the rolling load frequency conversion unit; and
   an AGC fault display unit for determining whether monitor AGC hunting or roll force AGC hunting has occurred if each of the frequencies is detected.

12. The apparatus as set forth in claim 11, wherein the control fault determination unit further comprises:
   a thickness convergence period calculation unit for calculating a period that a thickness deviation between the actually measured thickness value and the corresponding target value takes to converge into a reference value;
   a thickness convergence period determination unit for determining whether the convergence period is longer than a corresponding preset value set in the SCC setting unit; and
   an AGC gain shortage display unit for determining that an AGC gain shortage has occurred if the convergence period is longer than the corresponding preset value and displaying the AGC gain shortage.

13. The apparatus as set forth in claim 11, wherein the control fault determination unit further comprises:
   a thickness/width polarity determination unit for determining whether a width variation and a thickness variation have a same polarity at a point when a Down Coiler (DC) is turned on, and determining that necking has occurred if the two variations have the same polarity;
   a temperature/thickness polarity determination unit for determining whether there is a correlation between a temperature variation and a thickness variation, and determining that a material and temperature fault has occurred if there is the correlation;
   a thickness/gap occurrence point determination unit for determining whether an operator roll gap intervention fault has occurred by determining whether the roll gap intervention of the operator has occurred in a stand where the thickness variation occurred; and
   a necking display unit for determining that necking has occurred without a width variation if the roll gap intervention has not occurred at the point when the thickness variation occurred.

14. The apparatus as set forth in claim 2, wherein the facility fault determination unit comprises:
   a roll eccentricity fault diagnosis module for calculating upper and lower rotation frequencies of a backup roll if a thickness deviation between the corresponding target value set in the SCC setting unit and the actually measured value is larger than the consumer control tolerance, FFT converting an actually measured exit side thickness value and calculating a frequency fa corresponding to each spectrum intensity using the FFT converted value, determining whether there is a point where a value n times the rotation frequency of the backup roll and the frequency fa corresponding to each spectrum intensity coincide with each other, determining whether the spectrum intensity corresponding to the frequency fa is larger than a coefficient set in the SCC setting unit, and displaying a stand where roll eccentricity has occurred; and
   a thickness gauge fault diagnosis module for determining whether a thickness variation larger than a corresponding preset value has occurred in a period of single sampling if the thickness deviation is larger than the control tolerance and the exit side thickness deviation is continuously larger than $\beta$ over a preset value $\gamma$ set in the SCC setting unit, and displaying a thickness gauge fault if the thickness variation larger than the preset value has occurred.

15. The apparatus as set forth in claim 14, wherein the facility fault determination unit further comprises:
   a temperature gauge fault diagnosis module for determining that a temperature gauge has occurred if a temperature deviation has varied by a corresponding preset value set in the SCC setting unit or more and a load variation having occurred in a period of single sampling has varied by a corresponding preset value set in the SCC setting unit or more.

16. The apparatus as set forth in claim 1, wherein the confidence rate determination unit comprises:
   a thickness deviation excess determination unit for determining whether a thickness deviation between the corresponding target value set in the SCC setting unit and the actually measured thickness value is larger than a consumer control tolerance;

a correlation calculation unit for calculating a correlation C1 between an amount of operator intervention and a tension variation, a correlation C2 between the thickness deviation and the tension variation, and a correlation C3 between the amount of operator intervention and the thickness deviation if the thickness deviation is larger than the consumer control tolerance;

a correlation polarity evaluation unit for evaluating polarities of the correlations C1, C2 and C3; and a confidence rate calculating unit for determining the confidence rate to be 0 if at least one of the three correlations has a (−) sign, and determining the final confidence rate of the operator roll speed intervention to be a mean of the three correlations if all the three correlations have an (+) sign.

17. The apparatus as set forth in claim 16, wherein the confidence rate determination unit further comprises:

a spraying correlation calculation unit for calculating a correlation D1 between the thickness deviation and the actually measured temperature, calculating a correlation D2 between the thickness deviation, calculated using the gauge meter equation in the stand where the operator spraying intervention has occurred, and the actually measured temperature, a correlation D3 between the actually measured thickness deviation and the thickness deviation calculated using the gauge meter equation, if the thickness deviation is larger than the consumer control tolerance; and a spraying confidence rate calculation unit for determining the confidence rate to be 0 if at least one of the three correlations D1, D2 and D3 has a (−) sign, and determining the final confidence rate of the operator spraying intervention to be a mean of the three correlations D1, D2 and D3 if all the three correlations have a (+) sign.

18. The apparatus as set forth in claim 17, wherein the correlation calculation unit or spraying correlation calculation unit calculates the correlations (C1, C2, C3, D1, D2, D3) the following Equation 1 if it is assumed that two data for calculation of the correlation are f and g, respectively.

$$C1 = \frac{<f,g>}{\|f\| \cdot \|g\|} = \frac{\sum_{k=1}^{N} f_k g_k}{\sqrt{\sum_{k=1}^{N} f_k^2} \cdot \sqrt{\sum_{k=1}^{N} g_k^2}} \quad (1)$$

where Cx (x=1,2,3), Dx(x=1,2,3) is the correlation, f and g are data vectors, <f, g> is the inner product of two vectors, and is a magnitude of a vector.

19. The apparatus as set forth in claim 16, wherein the correlation calculation unit or spraying correlation calculation unit calculates the correlations (C1, C2, C3, D1, D2, D3) the following Equation 1 if it is assumed that two data for calculation of the correlation are f and g, respectively.

$$C1 = \frac{<f,g>}{\|f\| \cdot \|g\|} = \frac{\sum_{k=1}^{N} f_k g_k}{\sqrt{\sum_{k=1}^{N} f_k^2} \cdot \sqrt{\sum_{k=1}^{N} g_k^2}} \quad (1)$$

where Cx (x=1,2,3), Dx(x=1,2,3) is the correlation, f and g are data vectors, <f, g> is the inner product of two vectors, and $\| \ \|$ is a magnitude of a vector.

20. The apparatus as set forth in claim 1, the confidence rate determination unit comprises:

a thickness deviation excess determination unit for determining whether a thickness deviation between the corresponding target value set in the SCC setting unit and the actually measured thickness is larger than a consumer control tolerance;

a stand mean spectrum intensity calculation unit for calculating a mean spectrum intensity of each stand using spectrum intensities of upper and lower backup rolls if the thickness deviation is larger than the consumer control tolerance;

a spectrum intensity mean calculation unit for calculating a mean of spectrum intensities at frequencies other than the main frequencies of the upper and lower backup rolls;

a spectrum intensity comparison unit for calculating a deviation between the spectrum intensity at the main frequencies and the spectrum intensity at the frequencies other than the main frequencies; and a confidence rate calculation unit for calculating the confidence rate of roll eccentricity using a deviation between the spectrum intensity obtained in the stand mean spectrum intensity calculation unit and the spectrum intensity obtained in the spectrum intensity mean calculation unit, if the spectrum intensity obtained in the stand mean spectrum intensity calculation unit is higher than the spectrum intensity obtained in the spectrum intensity mean calculation unit.

21. The apparatus as set forth in claim 1, wherein the confidence rate determination unit comprises:

a thickness deviation excess determination unit for determining whether a thickness deviation between the corresponding target value set in the SCC setting unit and the actually measured thickness is larger than a consumer control tolerance;

a variation amount calculation unit for calculating an amount of thickness variation caused by a temperature fault, an amount of thickness variation caused by both intervention, and an amount of thickness variation caused by an FSU fault;

a polarity evaluation unit for evaluating the polarities of the three amounts of variation and an X-ray thickness deviation; and a confidence rate calculation unit for determining a final confidence rate to be 0 if the polarities are different from each other, and determining each of the confidence rates to be in proportion to the X-ray thickness deviation.

22. The apparatus as set forth in claim 21, wherein the confidence rate calculation unit calculates the confidence rates using the following equations.

$$\Delta h_{\text{xray\_top}} = \Delta h_{fdt}^X + \Delta h_{both}^X + \Delta h_{fsu}^X$$

$$C_{fdt} = \frac{\Delta h_{fdt}^X}{\Delta h_{\text{xray\_top}}} \cdot 100[\%]$$

$$C_{both} = \frac{\Delta h_{both}^X}{\Delta h_{\text{xray\_top}}} \cdot 100[\%]$$

$$C_{fsu} = \frac{\Delta h_{fsu}^X}{\Delta h_{\text{xray\_top}}} \cdot 100[\%]$$

where $C_{fdt}$ is the confidence rate of a temperature fault, $C_{both}$ is confidence rate of both intervention, $C_{fsu}$ is the confidence rate of an FSU setting error, $\Delta h_{fdt}^x$ is the amount of X-ray sheet thickness variation attributable to a temperature fault, $\Delta h_{fdt}^x$ is the amount of X-ray sheet thickness variation attributable to both intervention, and $\Delta h_{fsu}^x$ is the amount of X-ray sheet thickness variation attributable to an FSU setting error.

23. A method of diagnosing faults in hot strip finishing rolling, comprising:

a first step of presetting a target thickness, a target load, a target roll speed and a target roll gap according to rolling conditions;

a second step of collecting actually measured data if an exit side thickness gauge is loaded on;

a third step of identifying a front end part, a tail end part and a body part using the actually measured data;

a fourth step of calculating on-gauge ratios in the front end part, the tail end part and the body part using the preset values of the first step and the actually measured data of the second step;

a fifth step of determining whether faults have occurred in the front end part, the tail end part and the body part using the preset value of the first step and the on-gauge ratios of the fourth step;

a sixth step of determining whether an operator intervention fault, a material fault and a control fault have occurred at a point where a sheet thickness fault occurred; and a seventh step of calculating a confidence rate of the control fault using the preset values of the first step and the actually measured data of the second step.

24. The method as set forth in claim 23, wherein the sixth step further comprises the steps of:

determining whether operator intervention has occurred in a roll gap, a roll speed and spraying;

determining whether a material fault has occurred using a deviation between the entrance and exit side temperatures and the actually measured thickness value;

determining whether a facility fault by determining whether roll eccentricity or a sensor fault has occurred; and determining whether a control fault has occurred by examining FSU, AGC and a motor.

25. The method as set forth in claim 24, wherein the step of determining whether the operator intervention has occurred further comprises:

a first step of presetting a preset target value;

a second step of determining whether an amount of roll gap intervention is larger than the corresponding preset value set in the SCC setting unit if a sheet thickness deviation is larger than a consumer control tolerance, and determining whether an operator roll gap intervention fault has occurred by calculating an amount of thickness variation and comparing the amount of roll gap intervention with the amount of thickness variation if the amount of roll gap intervention is larger than the corresponding preset value;

a third step of determining whether a roll speed intervention fault has occurred by calculating an inter-stand tension and comparing the calculated inter-stand tension with preset tension value set in the SCC setting unit; and a fourth step of calculating a sheet thickness using a stand load, comparing the calculated sheet thickness with the actually measured thickness, and determining that a spraying intervention fault has occurred if a deviation between the calculated sheet thickness with the actually measured thickness is smaller than the preset critical value and a pattern of the thickness variation coincides with a pattern of an exit side temperature variation.

26. The method as set forth in claim 25, wherein the step of determining whether the operator intervention has occurred further comprises the step of:

collecting actually measured data by measuring actually measured data, such as a thickness, an entrance side temperature, an exit side temperature, a rolling load and a roll gap of the rolled sheet.

27. The method as set forth in claim 24, wherein the step of determining whether the material fault has occurred further comprises the steps of:

a first step of presetting a preset target values value, such as a target thickness, a target load, a target roll speed and a target roll gap according to rolling conditions;

a second step of obtaining a sample rolling length using a maximal speed of each stand if a thickness deviation between the corresponding target value set in the SCC setting unit and the actually measured thickness value is larger than a consumer control tolerance, converting a thickness into constant length pitches based on the sample rolling length, and calculating a frequency of a period of a skid mark using the thickness data; and a third step of determining whether a skid mark has occurred by calculating a frequency corresponding to each spectrum intensity using the converted value obtained from the actually measured thickness FFT conversion unit, searching for a frequency coinciding with a frequency of the skid mark and evaluating a spectrum intensity of the coinciding frequency.

28. The method as set forth in claim 27, wherein the step of determining whether the material fault has occurred further comprises:

a fourth step of determining whether there is an interval where a sheet thickness is suddenly changed;

a fifth step of determining whether there is a possibility that a transformation fault occurs using the preset target temperature value set at the first step and an amount of carbon if, as a result of the determination at the fourth step, there is the interval where the sheet thickness is suddenly changed;

a sixth step of determining whether an actually measured temperature satisfies a condition for occurrence of transformation if, as a result of the determination at the fifth step, there is the possibility that the transformation fault occurs; and a seventh step of determining whether there is a correlation between an actually measured load and a thickness by determining whether each stand coincides with a position of the sudden change of a sheet thickness if, as a result of the determination at the sixth step, the actually measured temperature satisfies the condition for occurrence of transformation.

29. The method as set forth in claim 24, wherein the step of determining whether the facility fault has occurred further comprises:

a first step of presetting a preset target value, such as a target thickness, a target load, a target roll speed and a target roll gap according to rolling conditions;

a second step of calculating upper and lower rotation frequencies of a backup roll if a thickness deviation between the corresponding target value set in the first step and the actually measured value is larger than the consumer control tolerance, FFT converting an actually measured exit side thickness value and calculating a frequency fa corresponding to each spectrum intensity using the FFT converted value, and determining whether there is a point where a value n times the rotation frequency of the backup roll and the frequency fa corresponding to each spectrum intensity coincide with each other;

a third step of determining whether the spectrum intensity corresponding to the frequency fa is larger than a coefficient set in the first step, and displaying a stand where roll eccentricity has occurred; and a fourth step of determining whether a thickness variation larger than a corresponding preset value has occurred in a period of single sampling if the thickness deviation is larger than the control tolerance and the exit side thickness deviation is continuously larger than $\beta$ over a preset value $\gamma$ set in the SCC setting unit, and displaying a thickness gauge fault if the thickness variation larger than the preset value has occurred.

30. The method as set forth in claim 29, wherein the step of determining whether the facility fault has occurred further comprises:

a fifth step of determining that a temperature gauge has occurred if a temperature deviation has varied by a corresponding preset value set in the first step or more and a load variation having occurred in a period of single sampling has varied by a corresponding preset value set in the SCC setting unit or more.

* * * * *

UNITED STATES PATENT AND TRADEMARK OFFICE
CERTIFICATE OF CORRECTION

PATENT NO. : 6,839,605 B2
DATED : January 4, 2005
INVENTOR(S) : Park et al.

It is certified that error appears in the above-identified patent and that said Letters Patent is hereby corrected as shown below:

Column 33,
Line 64, "have a sane polarity" should read -- have a same polarity --.

Column 37,
Line 35, "as set forth in claim 17" should read -- as set forth in claim 16 --.
Line 51, "and is a magnitude" should read -- and ‖ ‖ is a magnitude --.
Line 51, "as set forth in Claim 16" should read -- as set forth in Claim 17 --.

Column 40,
Line 15, "target values value" should read -- target value --.

Signed and Sealed this

Eighteenth Day of October, 2005

JON W. DUDAS
*Director of the United States Patent and Trademark Office*